US009928269B2

(12) United States Patent
Bradley et al.

(10) Patent No.: US 9,928,269 B2
(45) Date of Patent: Mar. 27, 2018

(54) APPLY CORRECTIONS TO AN INGESTED CORPUS

(71) Applicant: International Business Machines Corporation, Armonk, NY (US)

(72) Inventors: Lisa M. Bradley, Cary, NC (US); Christina R. Carlson, Chanhassen, MN (US); Andrew R. Freed, Cary, NC (US); Roderick C. Henderson, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 14/588,908

(22) Filed: Jan. 3, 2015

(65) Prior Publication Data

US 2016/0196298 A1 Jul. 7, 2016

(51) Int. Cl.
*G06F 17/30* (2006.01)
*G06F 17/27* (2006.01)

(52) U.S. Cl.
CPC .... *G06F 17/30377* (2013.01); *G06F 17/2785* (2013.01); *G06F 17/30011* (2013.01); *G06F 17/30368* (2013.01)

(58) Field of Classification Search
None
See application file for complete search history.

(56) References Cited

U.S. PATENT DOCUMENTS 8,560,300 B2 10/2013 Ferrucci et al.
2007/0136246 A1* 6/2007 Stenchikova ......... G06F 17/279
2009/0070311 A1* 3/2009 Feng ................ G06F 17/30654
2009/0089126 A1* 4/2009 Odubiyi .............. G06F 17/271
705/7.39
2011/0022614 A1* 1/2011 Wilson ............... G06F 17/2785
707/758
2011/0078192 A1* 3/2011 Murdock, IV .... G06F 17/30654
707/780
2012/0166180 A1* 6/2012 Au ....................... G06F 17/274
704/9

(Continued)

FOREIGN PATENT DOCUMENTS

CN 103440287 12/2013
WO 2009015047 1/2009

*Primary Examiner* — Wilson Lee
(74) *Attorney, Agent, or Firm* — Van Leeuwen & Van Leeuwen; Diana R. Gerhardt

(57) ABSTRACT

An approach is provided to correct documents ingested by a question answering (QA) system. A document previously ingested by the QA system is selected. A correction to the selected document is identified from one or more correction sources and the correction is applied to the selected document within the QA system. In one embodiment, the correction source is a non-ingested document, such as a published document or an issued correction. In another embodiment, the correction source is a post in a forum. In this embodiment, a statement in the ingested document is compared with a contradictory statement found in an ingested post of a threaded discussion. The statement and the contradictory statement are evaluated by the QA system. The statement in the ingested document is replaced with the contradictory statement in response to the evaluation revealing that the contradictory statement is correct and that the statement is incorrect.

18 Claims, 27 Drawing Sheets

(56) References Cited

U.S. PATENT DOCUMENTS

| | | | |
|---|---|---|---|
| 2013/0017524 A1 | 1/2013 | Barborak et al. | |
| 2013/0021346 A1* | 1/2013 | Terman | G09B 5/08 345/467 |
| 2013/0159127 A1 | 6/2013 | Myslinski et al. | |
| 2014/0040312 A1* | 2/2014 | Gorman | G06F 17/2785 707/771 |
| 2015/0026106 A1* | 1/2015 | Oh | G06F 17/3069 706/12 |
| 2015/0169544 A1 | 6/2015 | Bufe et al. | |
| 2015/0309988 A1 | 10/2015 | Allen et al. | |

* cited by examiner

APPLY CORRECTIONS TO AN INGESTED CORPUS

BACKGROUND

With the increased usage of computing networks, such as the Internet, humans are currently inundated and overwhelmed with the amount of structured and unstructured information available to them from various sources. Information gaps abound as users search for information on various subjects and try to piece together what they find and what they believe to be relevant. To assist with such searches, recent research has been directed to generating knowledge management systems which may take an input, analyze it, and return results indicative of the most probable results to the input. Knowledge management systems provide automated mechanisms for searching through a knowledge base with numerous sources of content, e.g., electronic documents, and analyze them with regard to an input to determine a result and a confidence measure as to how accurate the result is in relation to the input.

One such knowledge management system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ Question Answering (QA) system is built on IBM's DeepQA technology used for hypothesis generation, massive evidence gathering, analysis, and scoring. DeepQA takes an input question, analyzes it, decomposes the question into constituent parts, generates one or more hypothesis based on both the decomposed question and the results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Once challenge faced by QA systems is that ingested documents are generally considered equal, from the standpoint of one document overriding or superseding another document. When a publisher offers corrections to previously published documents, there is no way to process these corrections in place, generally the new corpus will contain both the original and corrected documents or facts. Additionally, evidence sources are typically assigned a quality rating either by a general classification type (e.g., peer-reviewed journals as high quality, user blogs as low quality, etc.) or by recording how many times an evidence source is referenced in answers produced by the QA system. These evidence quality calculations are too static and course grained. They may not be updated when an evidence source is wrong, and may not be adjusted when that source issues a correction.

BRIEF SUMMARY

According to one embodiment of the present disclosure, an approach is provided to correct documents ingested by a question answering (QA) system. A document previously ingested by the QA system is selected. A correction to the selected document is identified from one or more correction sources and the correction is applied to the selected document within the QA system. In one embodiment, the correction source is a non-ingested document, such as a published document or an issued correction. In another embodiment, the correction source is a post in a forum. In this embodiment, a statement in the ingested document is compared with a contradictory statement found in an ingested post of a threaded discussion. The statement and the contradictory statement are evaluated by the QA system. The statement in the ingested document is replaced with the contradictory statement in response to the evaluation revealing that the contradictory statement is correct and that the statement is incorrect.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
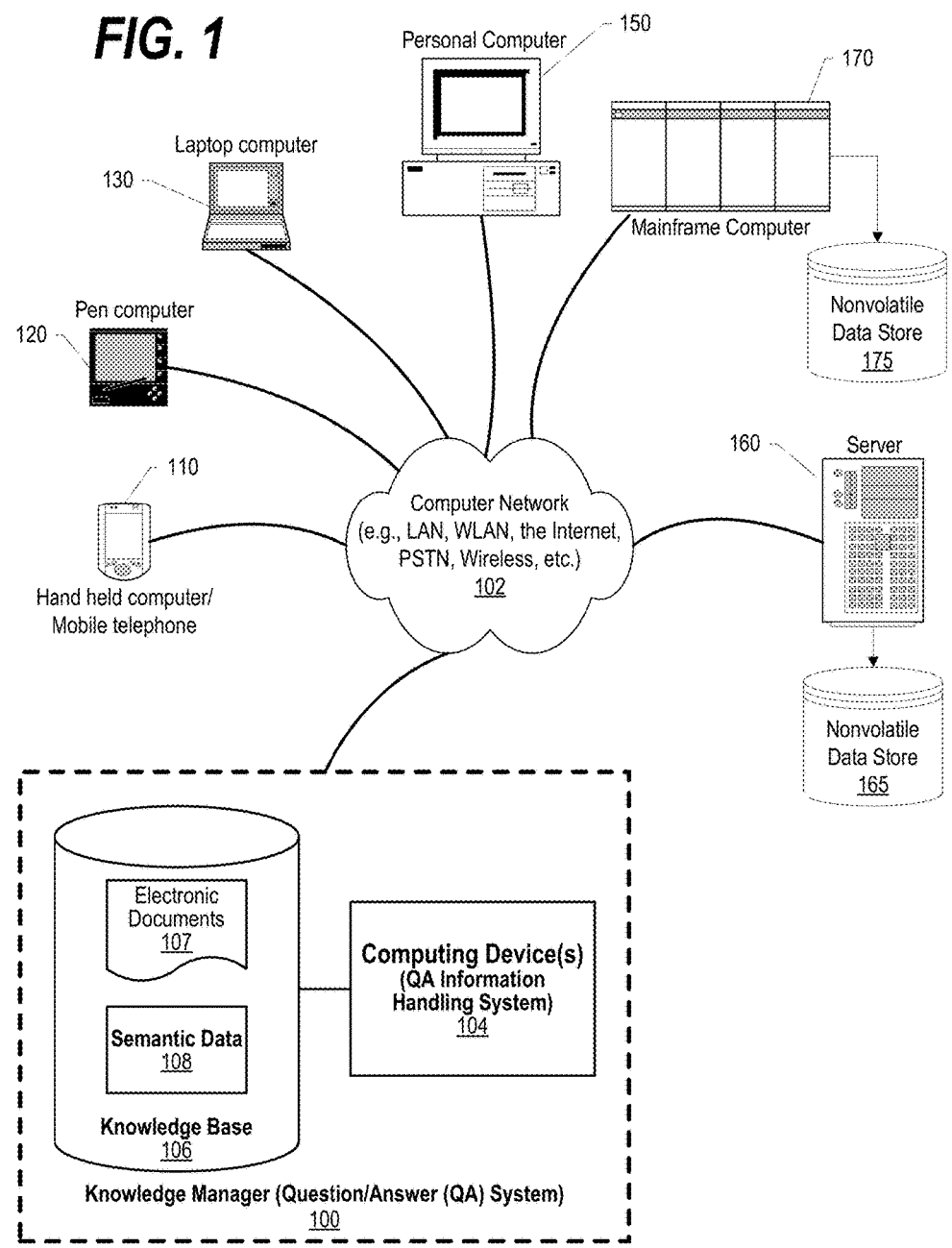
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
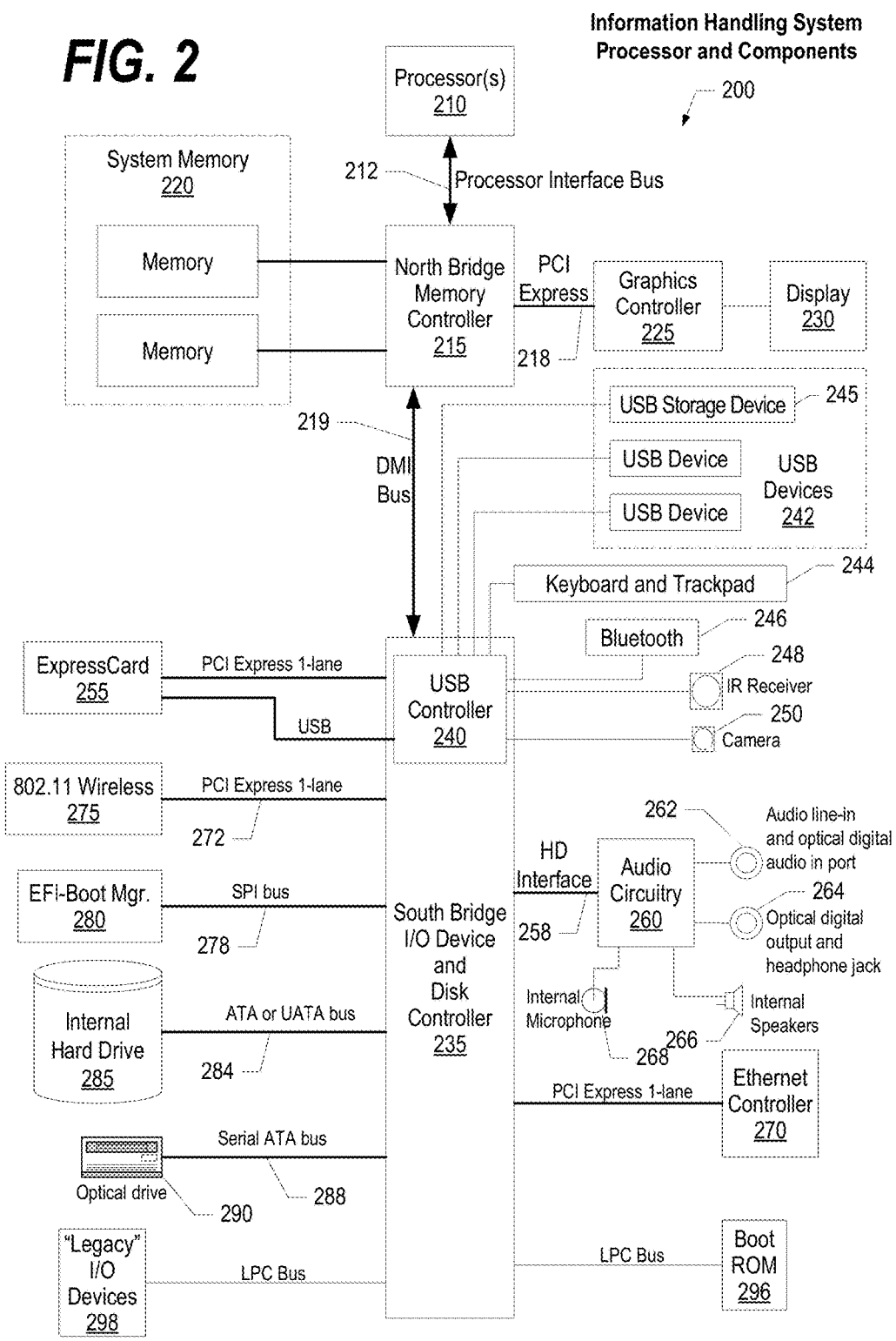
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272.

LAN device 275 typically implements one of the IEEE.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-27 depict an approach that corrects documents ingested by a question answering (QA) system. A document previously ingested by the QA system is selected. A correction to the selected document is identified from one or more correction sources and the correction is applied to the selected document within the QA system. In one embodiment, the correction source is a non-ingested document, such as a published document or an issued correction. In another embodiment, the correction source is a post in a forum. In this embodiment, a statement in the ingested document is compared with a contradictory statement found in an ingested post of a threaded discussion. The statement and the contradictory statement are evaluated by the QA system. The statement in the ingested document is replaced with the contradictory statement in response to the evaluation revealing that the contradictory statement is correct and that the statement is incorrect.

Figure 3:
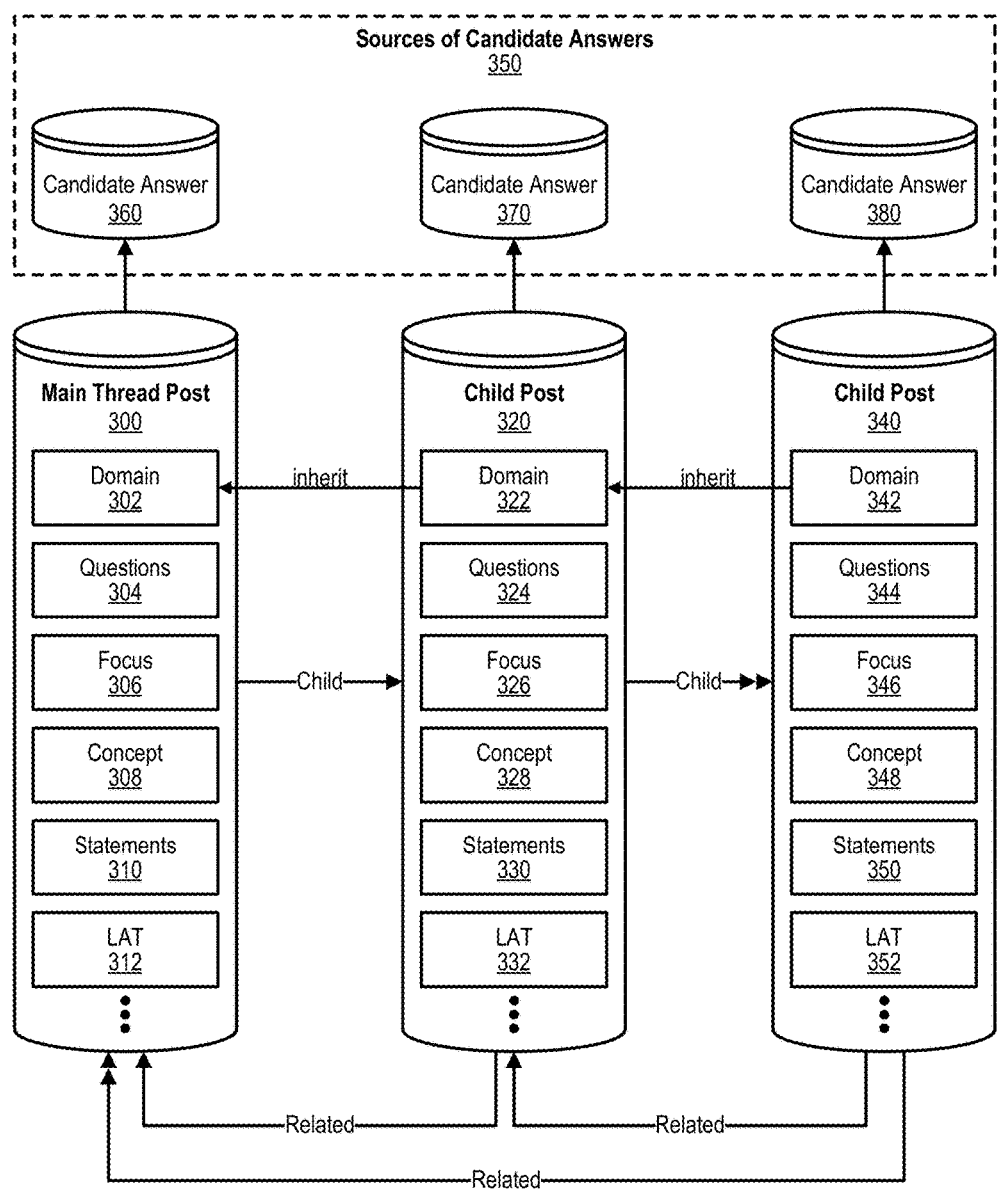
FIG. 3 is an exemplary diagram depicting the relationship between posts in a forum with candidate answers derived from the various posts.

FIG. 3 is an exemplary diagram depicting the relationship between posts in a forum with candidate answers derived from the various posts. Posts included in a forum include main thread post 300 and child posts (320 and 340). Posts are interrelated both through the common main thread post (300) but also outside the main post where some posts, while being a child post of the main post, also serve as "parent" posts to other child posts. FIG. 3 depicts an instance or embodiment of a threaded discussion, where there is a main post and child posts to a main post. In this embodiment, any posts can be a parent post of subsequent child posts, where text, images and information can be placed. There is an implicit relationship in a threaded discussion between the parent post and all child posts, and even grandchildren posts, etc. The threaded discussion can take place online, off-line, in direct communication in a chat engine, or in comments to messages in text messages. These threaded discussions can be built based on phone conversations, such as text messaging, where there is a back and forth discussion between multiple parties. Comments made to topics on the web can be treated as threaded discussions with a main post or topic and several child posts.

In the example shown, child post 320 is a child of main post 300 and child post 340 is a child of post 320, so that post 320 is a child to main post 300 and a parent post to child post 340. Relationships are established between child posts and their parent posts.

During analysis of the online forum, various types of data, or attributes, are gathered or deduced from the various posts. Each of the posts depicted (posts 300, 320, and 340) are each shown as having each of the attributes. These attributes include the domain to which the post belongs (domain 302 for main post 300, domain 322 for child post 322, and domain 342 for child post 342), questions included in the post (questions 304 for main post 300, questions 324 for child post 320, and questions 344 for child post 340), the focus of the post (focus 306 for main post 300, focus 326 for child post 320, and focus 346 for child post 340), the concept of the post (concept 308 for main post 300, concept 328 for child post 320, and concept 348 for child post 340), the statements made in the post (statements 310 for main post 300, statements 330 for child post 320, and statements 350 for child post 340), and the Lexical Answer Types ("LATs" which are the type of answer that will be required for the question, such as a person, place, film name, etc.). The LATs for the posts shown include LATs 312 for main post 300, LATs 332 for child post 320, and LATs 352 for child post 340.

Sources of candidate answers 350 include any posts in the forum based on the QA analysis performed by the QA system. The QA system utilizes resolved anaphors when analyzing child posts that refer to items that were included in parent posts. In the example, sources of candidate answers 350 include a candidate answer derived from main post 300 (candidate answer 360), a candidate answer derived from child post 320 (candidate answer 370), and a candidate answer derived from child post 340 (candidate answer 380).

The following is an example of anaphor resolution between posts. First, a main thread is posted to an online forum with a title of "Product outage next Friday from noon to midnight" with post text as "Hi everyone—the area I work in uses the product a lot—any chance the upgrade outage can be pushed until the weekend?" A child post is received that says "Hi John—our infrastructure support is M-F, so pushing stuff to the weekends is not usually possible. Especially in this case with technicians installing memory, they only work during the week. Keep in mind, you can still develop, just not deliver changes to each other." Here, the word "stuff" is an anaphor that refers to the term "upgrade" in the main post. Another post is received saying "Still down . . . any updates on the timeline?" Here, the words "still down" are an anaphor referring to the term "product outage" in the main post and the word "timeline" is an anaphor referring to the date and time ("Friday from noon to midnight") as the original timeline when the outage was scheduled. As used herein, a "term" in one post, such as a parent post, is any term, phrase, passage, or expression that provides a referential term to which an anaphor in a child post refers.

Figure 4:
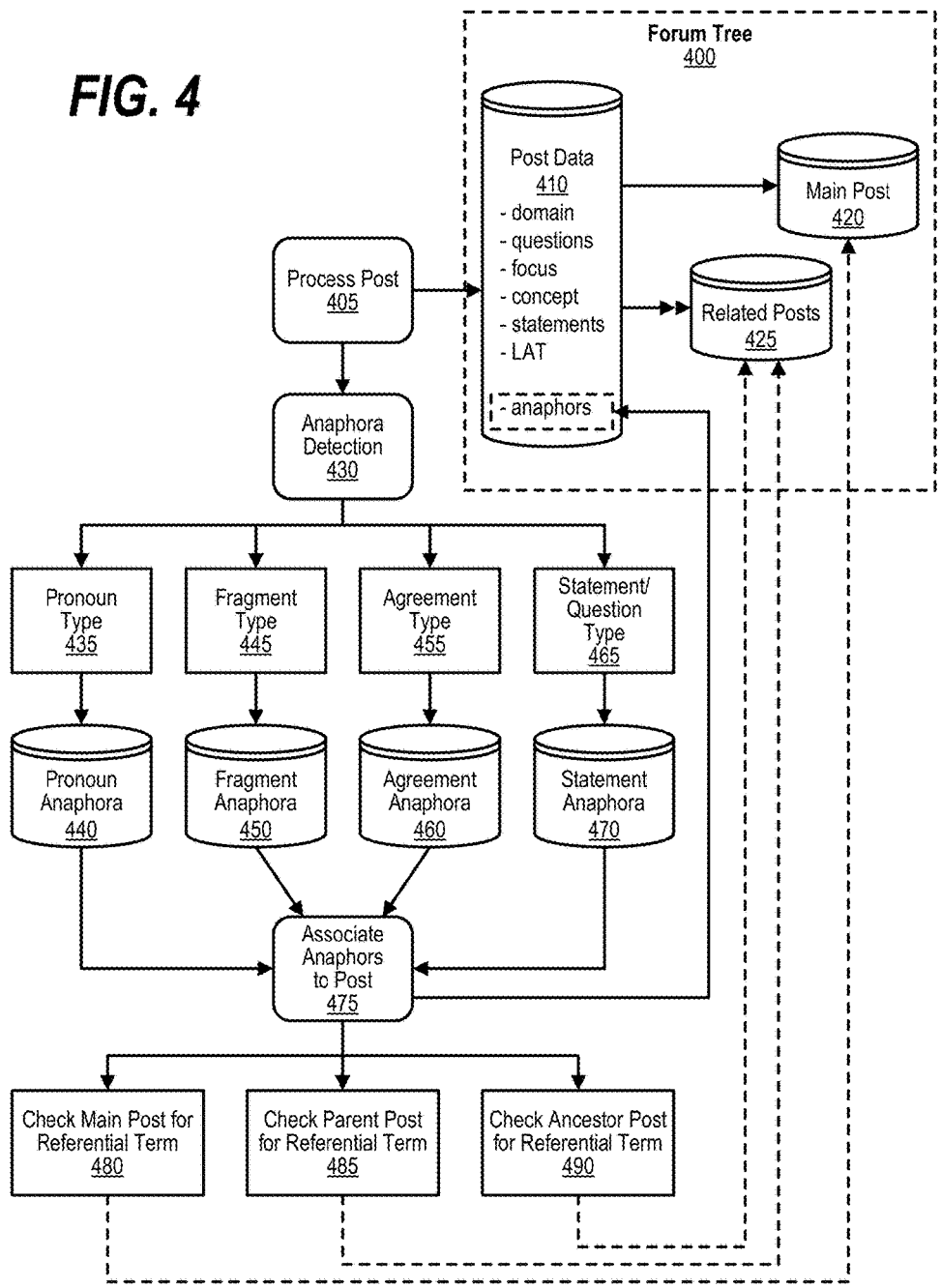
FIG. 4 is an exemplary diagram depicting various processes and data stores used to perform inter-thread anaphora resolution.

FIG. 4 is an exemplary diagram depicting various processes and data stores used to perform inter-thread anaphora resolution. Forum tree 400 is a collection of data pertaining to an online forum that is being analyzed. Post data 410 shows data elements, or attributes, that are gathered or deduced from the various posts including the domain of the post, questions posed by the post, the focus of the post, any concepts included in the post, statements made in the post and the Lexical Answer Type (LAT) of the post. In addition, anaphors that are found and resolved for the post are also stored for the post.

In forum tree 400, post data includes a main post 420 and relationships between posts, signified as related posts 425. Relationships include parent child relationships where one post (a child post) is posted after and references another post (the parent post). Main post 420 serves as a parent post to one or more other (child) posts in the forum tree.

Anaphora detection process 430 detects anaphors in identified child posts and uses referential data found in parent posts to resolve such anaphors. Anaphora detection can be broken down into different types of anaphora detection. These different types of anaphora detection include pronoun type 435 where a pronoun found in a child post refers to a noun found in a parent post. For example, the pronoun "he" found in a child post might refer to a person that was referenced in a parent post. Pronoun anaphors are stored in data store 440.

Another type of anaphora detection is fragment type 445 where a subject fragment that is found in a child post refers to a subject found in a parent post. Using the example introduced above for a software product outage, a fragment (anaphor) found in a child post of "still down" was detected and found to refer back to the product outage term that was referenced in the main post. Fragment anaphors are stored in data store 450.

Another type of anaphora detection is agreement type 455 where a statement of agreement that is found in a child post refers to an opinion or answer that was found in a parent post. For example, in a forum discussing a movie, a main post could opine that a particular movie was "fantastic." A child post could have a statement of agreement, such as "me too," or "+1," or "correct you are!" with such agreements referring back to the opinion that the movie was fantastic. Disagreements are also detected as agreement type anaphors where, instead of agreeing, the child post includes a statement of disagreement, such as "no way," "I don't think so," or "are you crazy?" with such agreements referring back to the opinion that the movie was fantastic. Agreement type anaphors are stored in data store 460.

Another type of anaphora detection is statement/question type 455 where a statement that is found in a child post refers to a question that was found in a parent post. For example, in a forum discussing the movie, a main post could pose a question of "who is the main actor in the movie?" A child post could provide an answer, such as "John Doe is the leading man in the film" with such answer referring back to the question posed in the parent post. Statement/question type anaphors are stored in data store 470.

Process 475 associates the anaphors found in the child posts to their respective terms found in their parent posts. The resolved anaphor (e.g., the pronoun "he" resolved to a particular person's name, etc.) is stored in the post's data in data store 410. To associate anaphors to parent posts, the parent posts with the relevant terms that is referenced by the anaphor found in the child post needs to be detected. This detection is performed by checking for referential terms in different types of posts. At 480, the main post in the thread or forum is checked for referential terms. At 485, the parent post of the child post is checked for referential terms. The referential terms might not be in the main or parent post, but might be in an intervening "ancestor" post between the main post and the parent post. At 490, these ancestor posts are checked for referential terms. When referential terms are found in a parent post (either the main post, the immediate parent post, or an ancestor post), the relationship is noted in forum tree 400.

Figure 5:
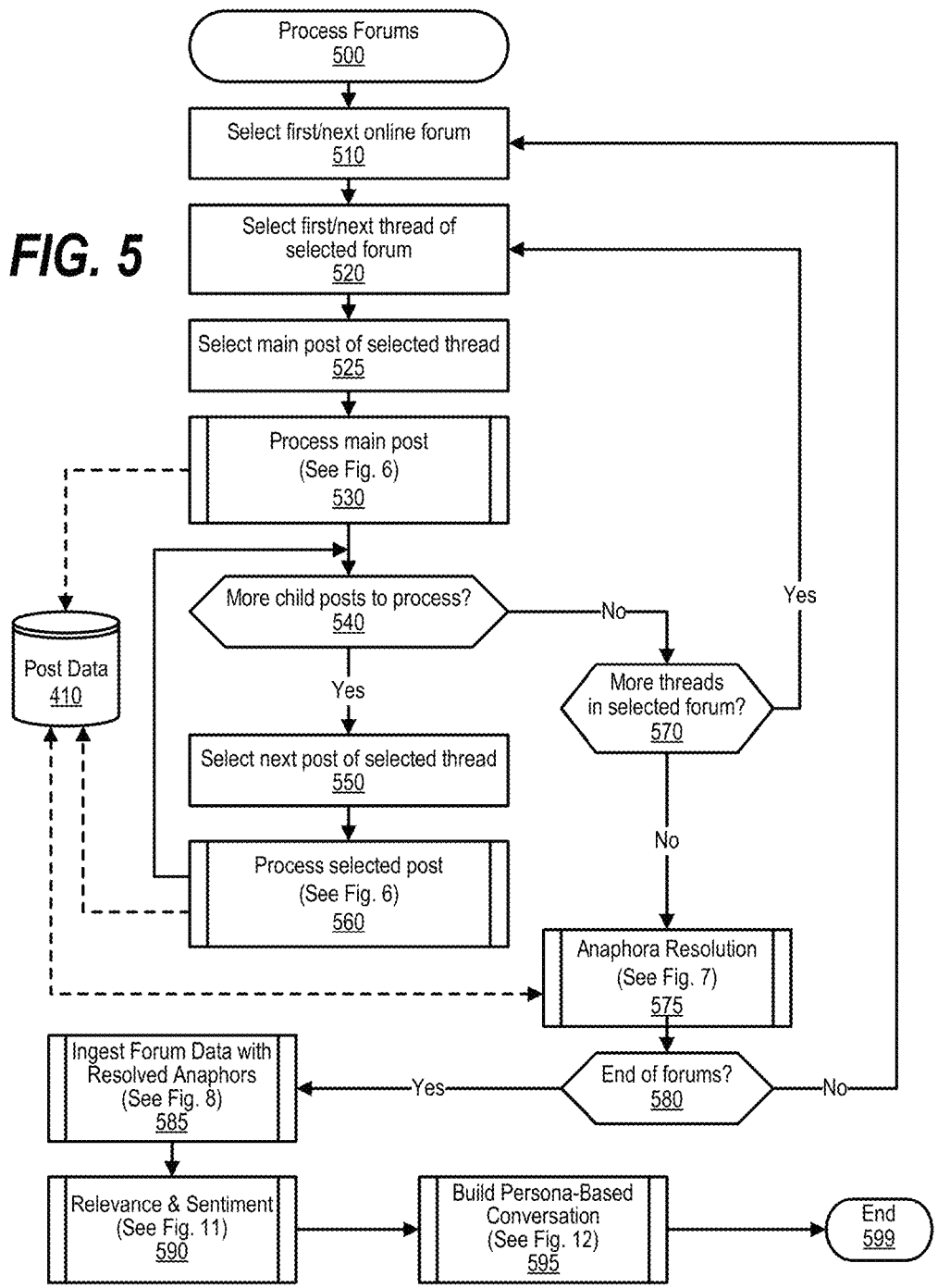
FIG. 5 is an exemplary high level flowchart that performs steps to process a forum for ingestion to a question answering (QA) system.

FIG. 5 is an exemplary high level flowchart that performs steps to process a forum for ingestion to a question answering (QA) system. FIG. 5 processing commences at 500 and shows the steps taken by a process that performs a routine that processes online forums. At step 510, the process selects the first online forum that is being processed. At step 520, the process selects the first thread from the selected forum. At step 525, the process selects the main post of selected thread.

Figure 6:
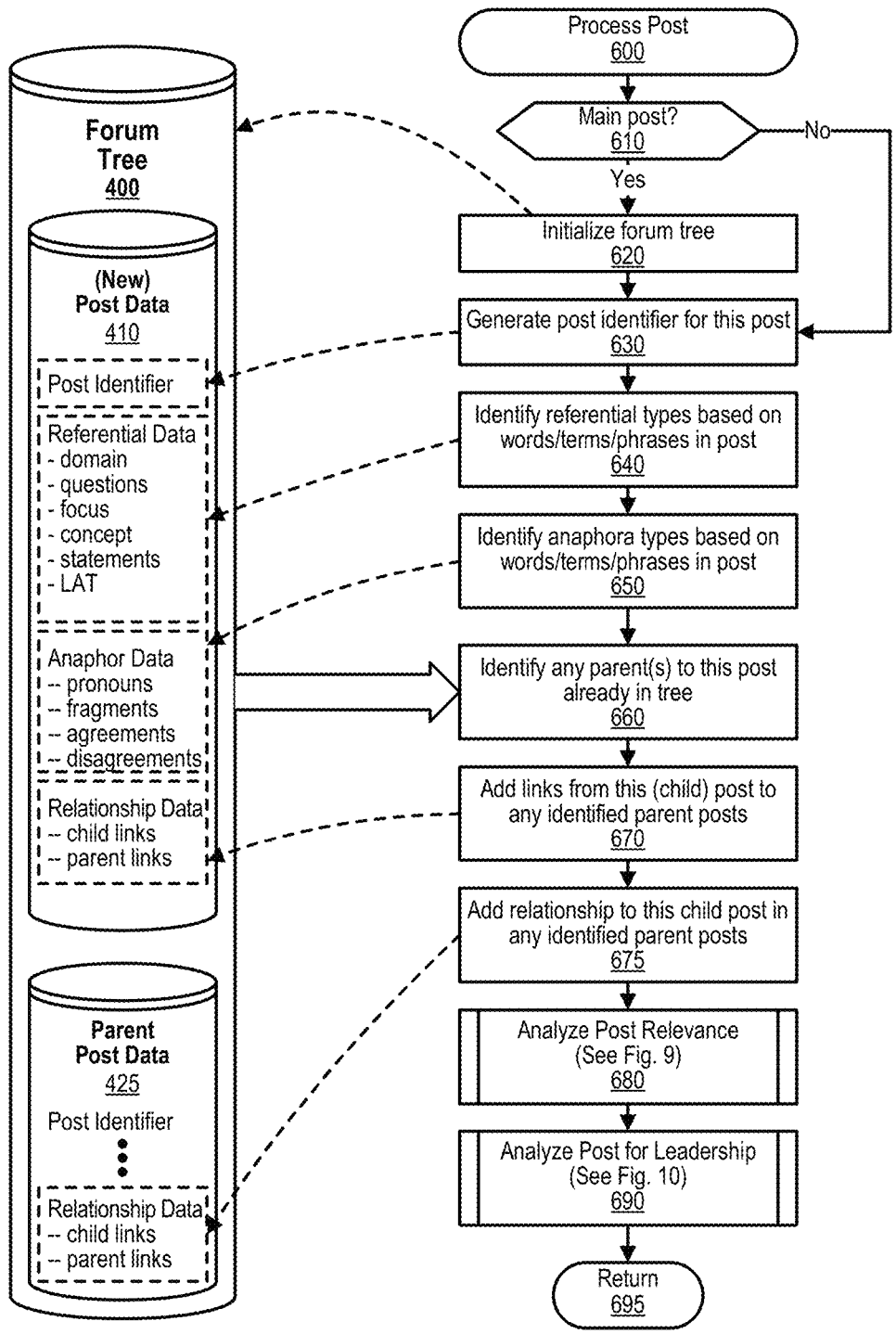
FIG. 6 is an exemplary flowchart that processes a selected post from a forum.

At predefined process 530, the main post is processed (see FIG. 6 and corresponding text for processing details). The data gathered from processing the main post is stored as post data in data store 410. The process determines as to whether there are child posts to process in the selected thread (decision 540). If there are more child posts to process, then decision 540 branches to the 'yes' branch to process additional child posts. At step 550, the process selects the next post from selected thread. At predefined process 560, the process performs the process selected post routine (see FIG. 6 and corresponding text for processing details). The data gathered from the child post is stored as post data in data store 410. Processing then loops back to decision 540.

Once all of the child posts are processed, decision 540 branches to the 'no' branch whereupon the process determines as to whether there are more threads in the selected forum to process (decision 570). If there are more threads in the selected forum to process, then decision 570 branches to the 'yes' branch which loops back to step 520 to select the next thread from the selected forum. This looping continues until there are no more threads in the selected forum to process, at which point decision 570 branches to the 'no' branch for anaphora resolution.

Figure 7:
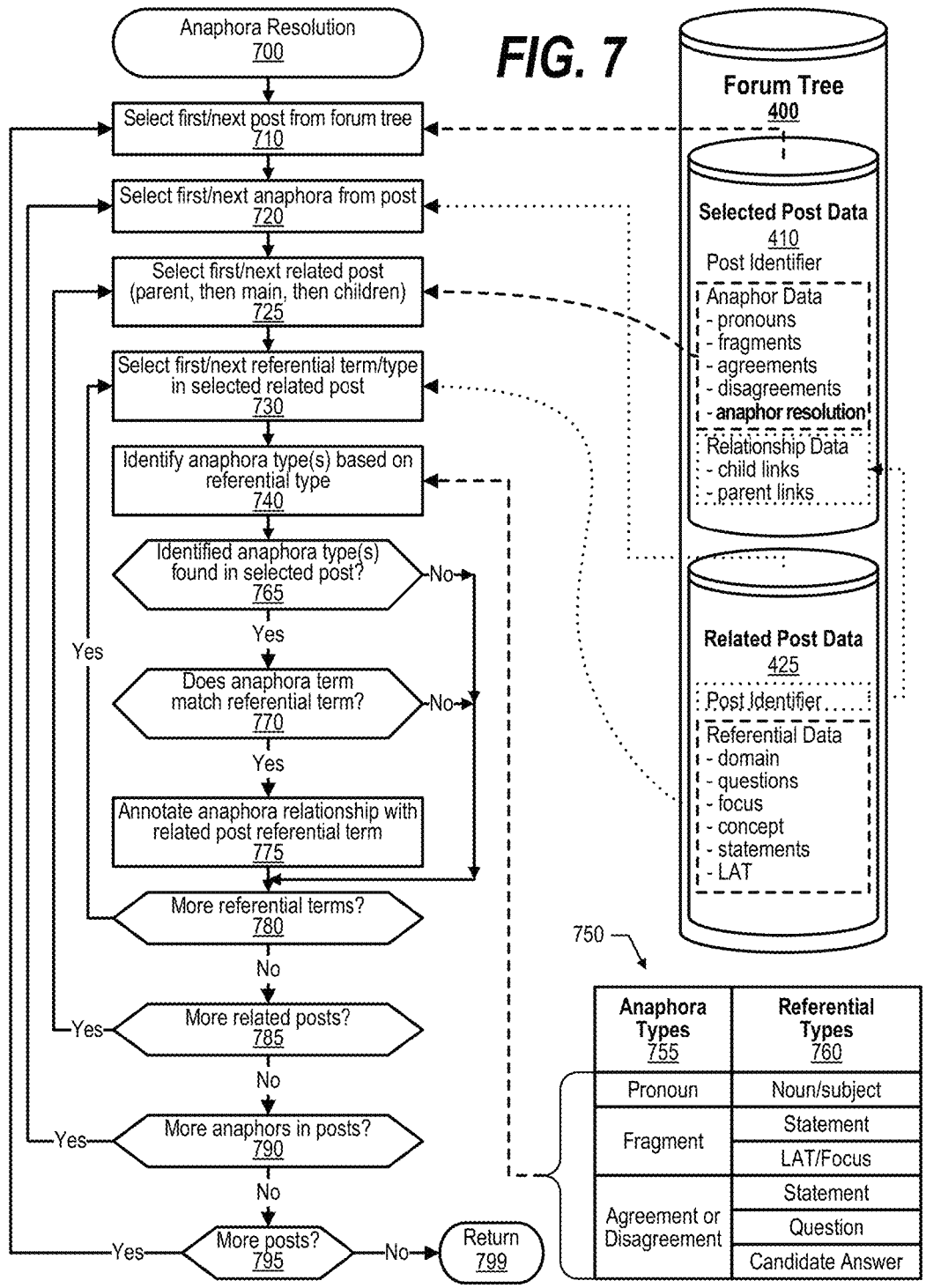
FIG. 7 is an exemplary flowchart depicting anaphora resolution of terms found in posts of a forum.

At predefined process 575, the process performs the anaphora resolution routine (see FIG. 7 and corresponding text for processing details). The anaphora resolution routine detects anaphors found in posts from post data store 410, resolves the anaphors with terms found in referential data from other posts stored in post data store 410, and resolves the anaphor by storing the identified terms referenced by the anaphors in the post data 410.

The process determines as to whether the end of forums being processed has been reached (decision 580). If the end of forums being processed has not yet been reached, then decision 580 branches to the 'no' branch which loops back to step 510 to select the next forum and process the posts in the forum as described above. This looping continues until the end of the forums being processed has been reached, at which point decision 580 branches to the 'yes' branch for further processing.

Figure 8:
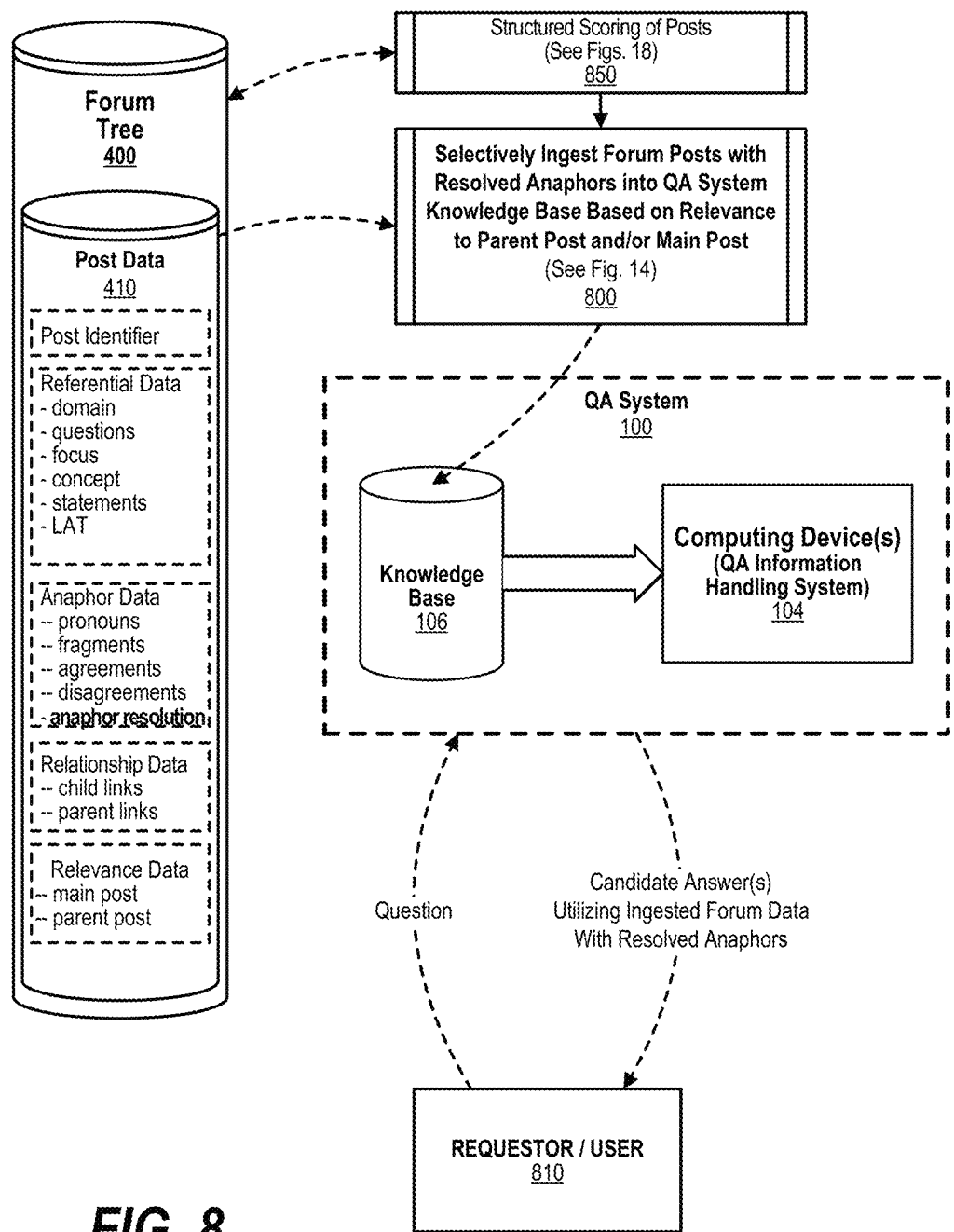
FIG. 8 is an exemplary flowchart depicting steps performed by the process that ingests forum data with resolved anaphors to a question answering (QA) system.

At predefined process 585, the process performs the Ingest Forum Data with Resolved Anaphors routine (see FIG. 8 and corresponding text for processing details). At predefined process 590, the process performs the Relevance & Sentiment routine (see FIG. 11 and corresponding text for processing details). At predefined process 595, the process performs the Build Persona-Based Conversation routine (see FIG. 12 and corresponding text for processing details). FIG. 5 processing thereafter ends at 599.

FIG. 6 is an exemplary flowchart that processes a selected post from a forum. FIG. 6 processing commences at 600 and shows the steps that perform a routine that processes data found in a post. The process determines as to whether the post being processed is the main post of the forum thread (decision 610). If the post being processed is the main post of the forum thread, then decision 610 branches to the 'yes' branch whereupon, at step 620, the process initializes forum tree 400 used to store the post data associated with this forum thread. On the other hand, if the post being processed is not the main post of the forum thread, then decision 610 branches to the 'no' branch bypassing step 620.

At step 630, the process generates a unique post identifier for this post and adds a record used to store this post data in forum tree 400 with new post data 410. At step 640, the process identifies referential types based on words, terms, and phrases found in the post that is being processed. Referential data can include the domain of the post, questions posed by the post, the focus of the post, any concepts included in the post, statements made in the post and the Lexical Answer Type (LAT) of the post.

At step 650, the process identifies anaphora types based on the words, terms, and phrases found in post that is being processed. Types of anaphors include pronoun type anaphors, fragment type anaphors, agreement type anaphors, and statement type anaphors.

At step 660, the process identifies any parent(s) to this post that are already included in forum tree 400. Parent posts include the main post to the thread, the direct parent post of the thread, and any intervening parent (ancestor) posts between the main post and the direct parent post. At step 670, the process adds links from this (child) post to any identified parent posts that were found in step 660. At step 675, the relationships between this post and parent posts are added to post data included in data store 410. Links are added to this post as links to the parent posts, and in the respective parent post data (425) as links to this child post with data store 425 being a subset of data store 410 and shown as a separate data store for illustrative purposes.

Figure 9:
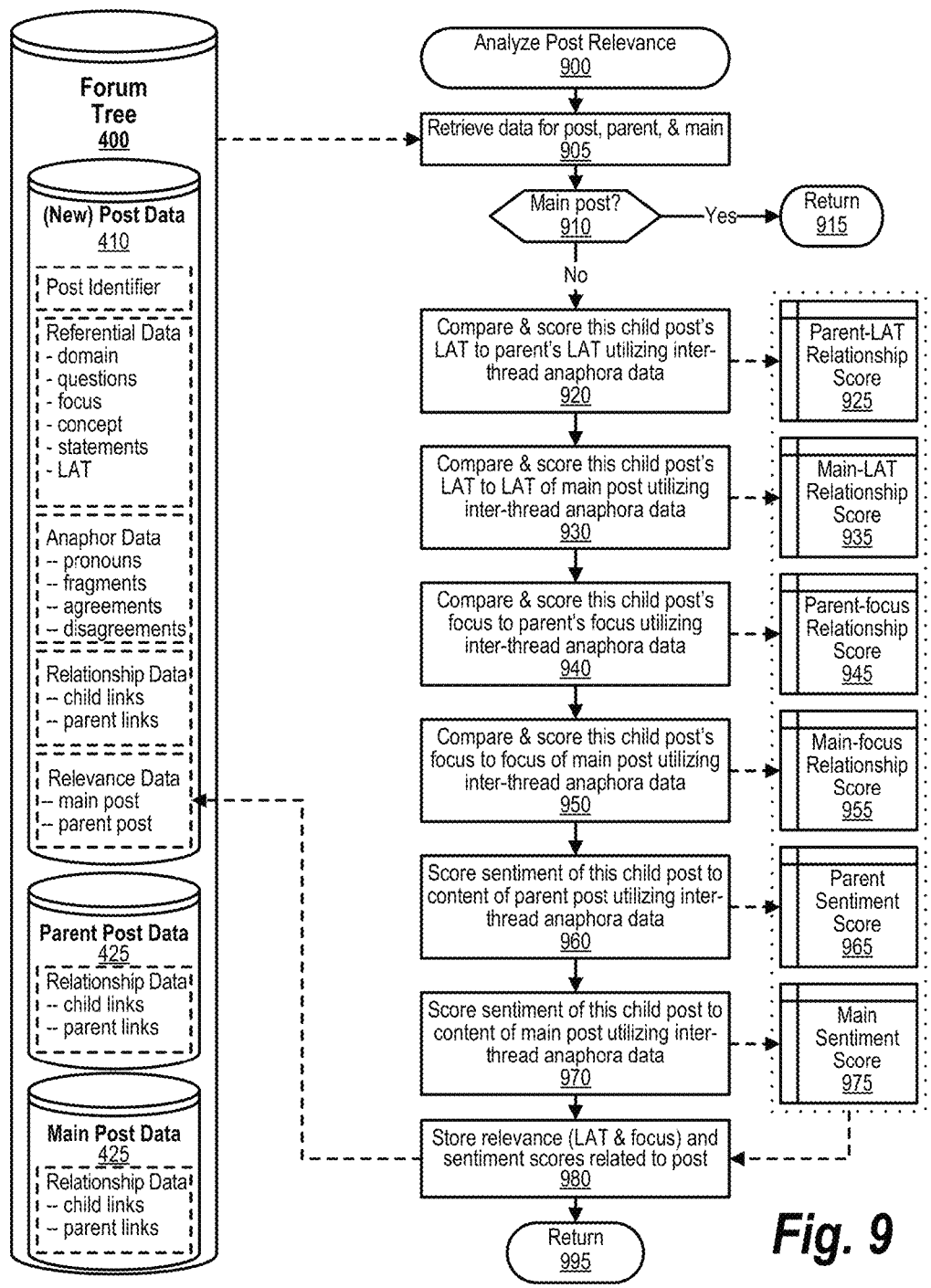
FIG. 9 is an exemplary flowchart depicting steps that analyze a post relevance.

At predefined process 680, the process performs the Analyze Post Relevance routine (see FIG. 9 and corresponding text for processing details). At predefined process 690, the process performs the Analyze Post for Leadership routine (see FIG. 10 and corresponding text for processing details). FIG. 6 processing thereafter returns to the calling routine (see FIG. 5) at 695.

FIG. 7 is an exemplary flowchart depicting anaphora resolution of terms found in posts of a forum. FIG. 7 processing commences at 700 and shows the steps taken by a process that performs a routine that resolves anaphors found in a child post. At step 710, the process selects the first post from forum tree 400. At step 720, the process selects the first anaphor from the selected post (if an anaphor exists in the post). At step 725, the process selects the first related post (immediate parent post, then main post, then ancestor posts) from forum tree 400. At step 730, the process selects the first referential term/type from the selected related post.

Table 750 depicts the relationship between anaphora types (755) and their respective referential types (760). Pronoun type anaphors are resolved with referential types found in a parent post of a noun or subject. Fragment type anaphors are resolved with referential types found in a parent post of a statement, a Lexical Answer Type (LAT), or focus. Agreement type anaphors are resolved with referential types found in a parent post of a statement or opinion, a question, or a candidate answer. At step 740, the process identifies anaphora type(s) for the selected anaphor based on the referential type as shown in table 750.

The process determines as to whether the identified anaphora type(s) were found in the selected child post (decision 765). If the identified anaphora type(s) were found in the selected child post, then decision 765 branches to the 'yes' branch for continued processing. On the other hand, if the identified anaphora type(s) were not found in the selected child post, then decision 765 branches to the 'no' branch bypassing decision 770 and step 775. The process determines as to whether the anaphora term found in the child post matches the referential term found in the parent post (decision 770). If the anaphora term found in the child post matches the referential term found in the parent post, then decision 770 branches to the 'yes' branch, whereupon, at step 775, the process annotates the anaphora relationship with related post referential term. In addition, at step 775, the anaphor found in the child post is resolved using the referential term found in the parent post. The annotated anaphora relationship data and the resolved anaphor data is stored in post data 410. On the other hand, if the anaphora term found in the child post does not match the referential term found in the parent post, then decision 770 branches to the 'no' branch bypassing step 775.

The process determines as to whether there are more referential terms that need to be processed (decision 780). If there are more referential terms that need to be processed, then decision 780 branches to the 'yes' branch which loops back to step 730 to select and process the next referential term. This looping continues until all referential terms have been processed, at which point decision 780 branches to the 'no' branch.

The process determines as to whether there are more related posts that need to be processed (decision 785). If there are more related posts that need to be processed, then decision 785 branches to the 'yes' branch which loops back to step 725 to select and process the next related post. This looping continues until all related posts have been processed, at which point decision 785 branches to the 'no' branch.

The process determines as to whether there are more anaphors included in the selected post that need to be processed (decision 790). If there are more anaphors included in the selected post that need to be processed, then decision 790 branches to the 'yes' branch whereupon processing loops back to step 720 to select and process the next anaphor from the selected post. This looping continues until all anaphors in the selected post have been processed, at which point decision 790 branches to the 'no' branch.

The process determines as to whether there are more posts in the forum tree that need to be processed (decision 795). If there are more posts in the forum tree that need to be processed, then decision 795 branches to the 'yes' branch which loops back to select and process the next post from the forum tree. This looping continues until all of the posts have been processed, at which point decision 795 branches to the 'no' branch and processing returns to the calling routine (see FIG. 5) at 799.

FIG. 8 is an exemplary flowchart depicting steps performed by the process that ingests forum data with resolved anaphors to a question answering (QA) system. At predefined process 850, the process performs the Structured Scoring of Posts that uses child agreement data to analyze statements made in parent posts. At predefined process 800, the process performs the Selectively Ingest Forum Posts with Resolved Anaphors into QA System Knowledge Base Based on Relevance to Parent Post and/or Main Post routine (see FIG. 14 and corresponding text for processing details). Predefined process 800 reads post data 410 from forum tree 400 and ingests the post data to knowledge base 106 that is utilized by question answering (QA) system 100. When requestor 810, such as a user of the QA system, poses a question to the QA system, the QA system may provide candidate answers that utilize the ingested forum data with such ingested data including resolved anaphors found in child post data.

FIG. 9 is an exemplary flowchart depicting steps that analyze the relevance of a post. FIG. 9 processing commences at 900 and shows the steps taken by a process that performs a routine that analyzes a post for relevance. At step 905, the process retrieves data from forum tree pertaining to a post, the post's parent(s) post(s), and the main post. The process determines as to whether the selected post is the main post (decision 910). If the selected post is the main post, then decision 910 branches to the 'yes' branch and processing returns to the calling routine (see FIG. 5) at 915. On the other hand, if the selected post is not the main post, then decision 910 branches to the 'no' branch and processing continues.

At step 920, the process compares and scores this child post's Lexical Answer Type (LAT) to its parent's LAT utilizing inter-thread anaphora data. Step 920 stores the Parent-LAT relationship score in memory area 925. At step 930, the process compares and score this child post's LAT to the LAT of the main post utilizing inter-thread anaphora data. Step 930 stores the Main-LAT relationship score in memory area 935.

At step 940, the process compares and score this child post's focus to its parent(s) focus utilizing inter-thread anaphora data. Step 940 stores the parent-focus relationship score in memory area 945. At step 950, the process compares and scores this child post's focus to the focus of the main post utilizing inter-thread anaphora data. Step 950 stores the main-focus relationship score in memory area 955.

At step 960, the process scores the sentiment of this child post to the content of parent post utilizing inter-thread anaphora data. Step 960 stores the parent sentiment score in memory area 965. At step 970, the process scores the sentiment of this child post to the content of the main post utilizing inter-thread anaphora data. Step 970 stores the main sentiment score in memory area 975. At step 980, the process stores the relevance scores (LAT & focus for the parent and main) and the sentiment scores related to post in post data 410. FIG. 9 processing thereafter returns to the calling routine (see FIG. 5) at 995.

Figure 10:
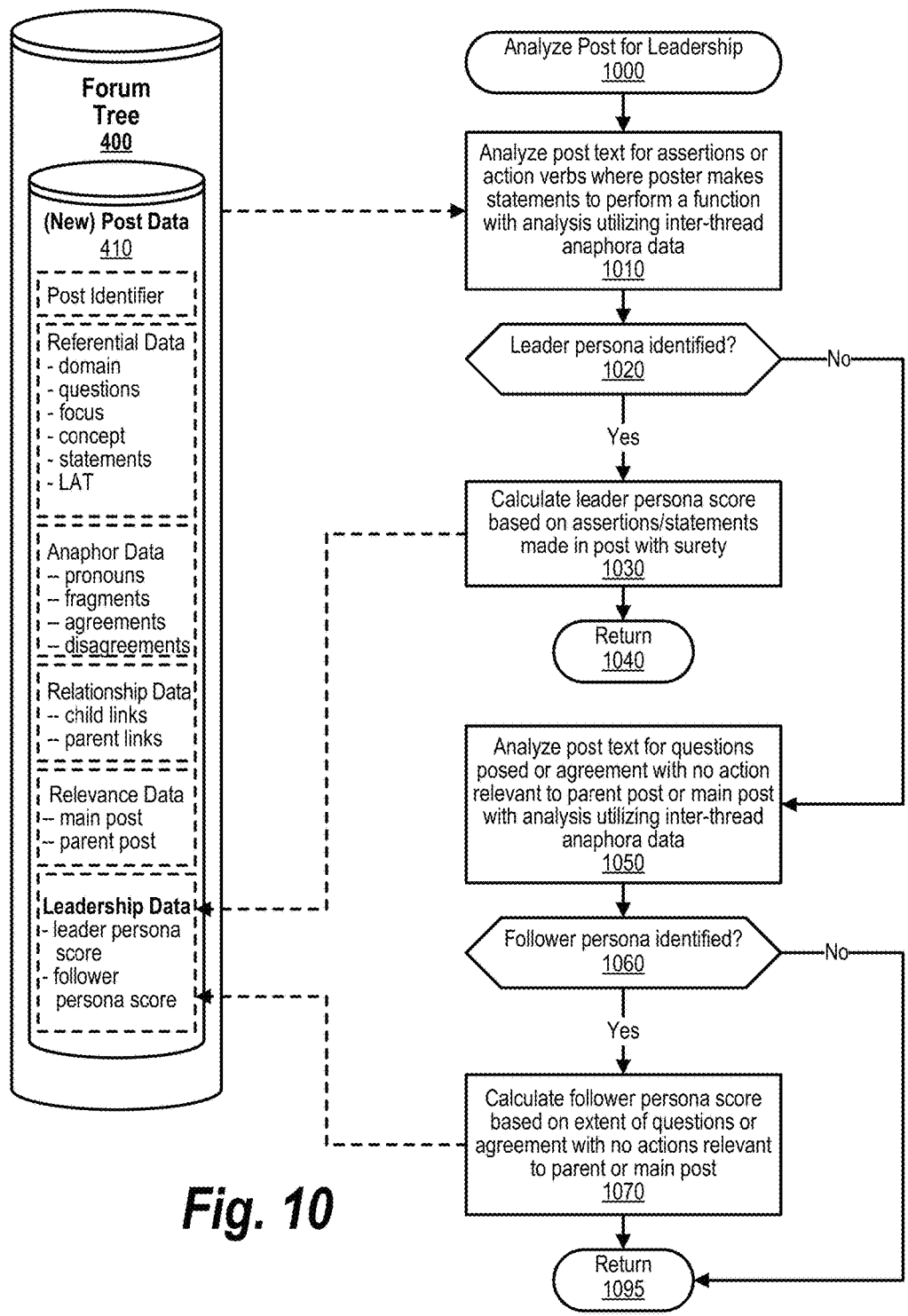
FIG. 10 is an exemplary flowchart depicting steps that analyze a post for leadership qualities.

FIG. 10 is an exemplary flowchart depicting steps that analyze a post for leadership qualities. FIG. 10 processing commences at 1000 and shows the steps taken by a process that performs a routine that analyzes a post for leadership or follower qualities. At step 1010, the process analyzes the selected post text from forum tree 400 for assertions or action verbs where the poster (writer of the post) makes statements to perform a function with the analysis of such leadership persona utilizing inter-thread anaphora data previously identified for the post.

The process determines as to whether leadership persona was identified in the post by step 1010 (decision 1020). If leadership persona was identified in the post, then decision 1020 branches to the 'yes' branch whereupon, at step 1030 the process calculates a leader persona score based on the assertions and/or statements made in post with surety. The leader persona score is stored as leadership data in the data pertaining to the post (data store 410). FIG. 10 processing thereafter returns to the calling routine (see FIG. 5) at 1040.

Figure 11:
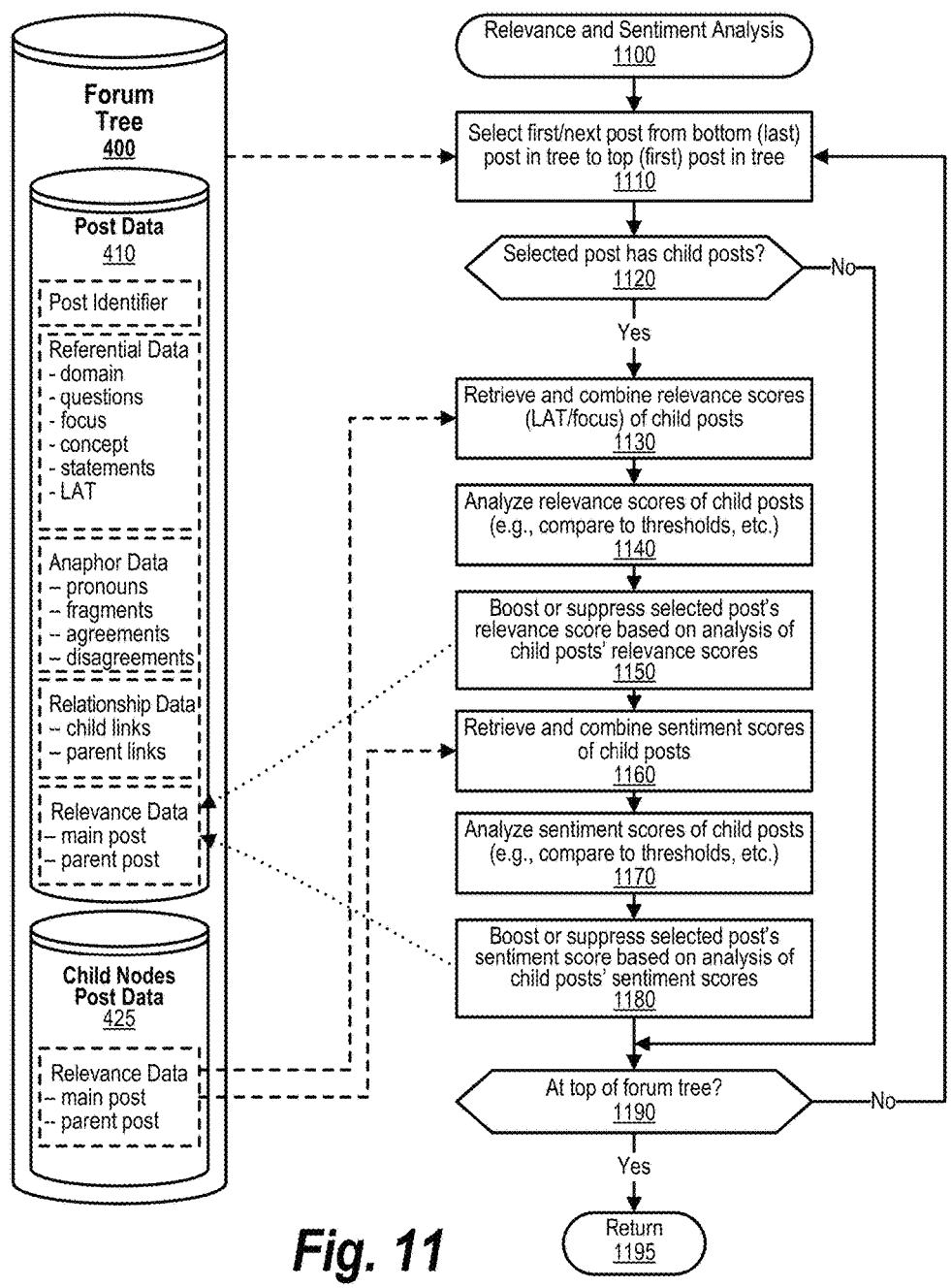
FIG. 11 is an exemplary flowchart depicting steps that perform relevance and sentiment analysis of posts in a forum.

On the other hand, if leadership persona was not identified in the post, then decision 1020 branches to the 'no' branch bypassing step 1030 and branching to steps that analyze the post for follower persona traits. At step 1050, the process analyzes the post text for questions posed by the poster or agreement made by the poster with little or no actions relevant to the post's parent post or to the main post. The analysis utilizes inter-thread anaphora data previously identified for the post. The process determines as to whether the analysis performed at step 1050 identified a follower persona in the post (decision 1160). If a follower persona is identified in the post, then decision 1160 branches to the 'yes' branch, whereupon at step 1070 the process calculates the follower persona score for the post based on the extent of questions or agreement in the post with little or no actions that are relevant to the post's parent post or to the main post. The follower persona score is stored as follower data in the leadership data pertaining to the post (data store 410). On the other hand, if a follower persona is not identified in the post, then decision 1160 branches to the 'no' branch bypassing step 1070. FIG. 11 processing thereafter returns to the calling routine (see FIG. 5) at 1195.

FIG. 11 is an exemplary flowchart depicting steps that perform relevance and sentiment analysis of posts in a forum. FIG. 11 processing commences at 1100 and shows the steps taken by a process that performs a relevance and sentiment analysis routine. At step 1110, the process selects the first post from bottom (last) post in tree as the forum tree is processed in reverse order from the bottom of the tree to the top (main post) of the tree. The process determines as to whether the selected post has child posts that reference the selected post (decision 1120). If the selected post has child posts that reference the selected post, then decision 1120 branches to the 'yes' branch to process the selected post using steps 1130 through 1180. On the other hand, if the selected post does not have any child posts that reference the selected post, then decision 1120 branches to the 'no' branch bypassing steps 1130 through 1180.

At step 1130, the process retrieves and combines the relevance scores (LAT/focus) of the child posts that refer to this selected (parent) post. At step 1140, the process analyzes the combined relevance scores of the child posts. For example, the relevance scores can be compared to thresholds that identify whether the post is somewhat more relevant than other posts. In one embodiment, the relevance scores are combined beforehand so that the tree's relevance scores can be used to obtain thresholds (e.g., above average relevance score, etc.). At step 1150, the process boosts or suppresses the selected post's relevance score based on analysis of the child posts' relevance scores that was performed in step 1140. For example, if the combined relevance scores are above average, then the selected post's relevance score might be boosted and if the combined relevance score is below average, then the selected post's relevance score might be reduced or otherwise suppressed. Additionally, posts with relevance scores in the top quartile or top ten percent might be further boosted and those posts with relevance scores in the bottom quartile or bottom ten percent might be further suppressed or reduced.

At step 1160, the process retrieves and combine the sentiment scores of the selected post's child posts. At step 1170, the process analyzes the combined sentiment scores of the selected post's child posts. For example, the sentiment scores can be compared to thresholds that identify whether the post is somewhat more relevant than other posts. In one embodiment, the sentiment scores are combined beforehand so that the tree's sentiment scores can be used to obtain thresholds (e.g., above average sentiment score, etc.). At step 1180, the process boosts or suppresses the selected post's sentiment score based on the analysis of the selected post's child posts' sentiment scores that was performed in step 1170. For example, if the combined sentiment scores are above average, then the selected post's sentiment score might be boosted and if the combined sentiment score is below average, then the selected post's sentiment score might be reduced or otherwise suppressed. Additionally, posts with sentiment scores in the top quartile or top ten percent might be further boosted and those posts with sentiment scores in the bottom quartile or bottom ten percent might be further suppressed or reduced.

The process determines as to whether the process has reached the top of forum tree with the last post selected having been the main post (decision 1190). If the process has not yet reached the top of forum tree, then decision 1190 branches to the 'no' branch which loops back to select and process the next post up the forum tree. This looping continues until all of the posts have been processed, at which point decision 1190 branches to the 'yes' branch and processing returns to the calling routine (see FIG. 5) at 1195.

Figure 12:
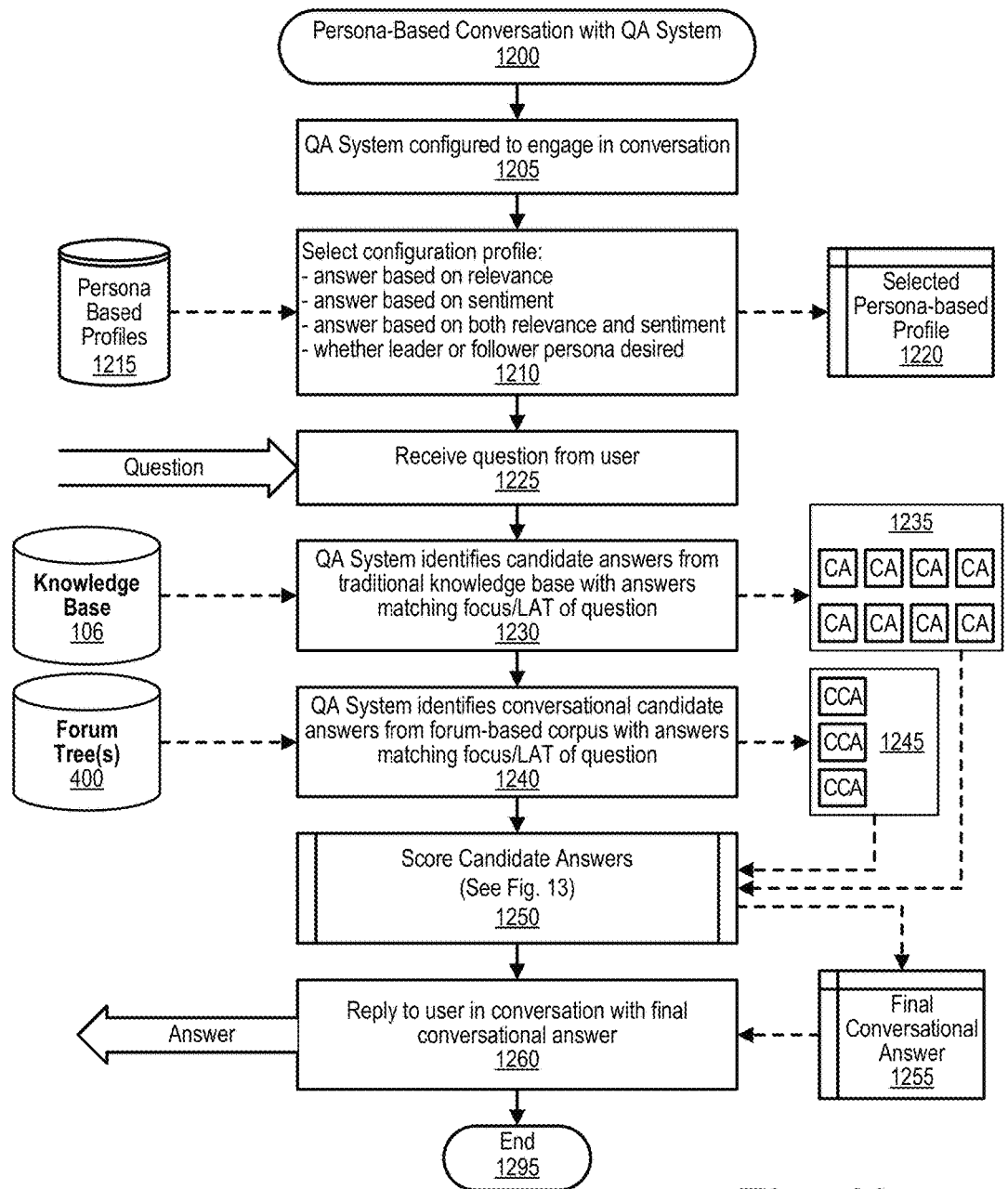
FIG. 12 is an exemplary flowchart depicting steps that build a persona-based conversation between a question answering (QA) system and a user of the system.

FIG. 12 is an exemplary flowchart depicting steps that build a persona-based conversation between a question answering (QA) system and a user of the system. FIG. 12 processing commences at 1200 and shows the steps taken by a process that performs a persona-based conversation routine that allows a user to have a natural language conversation with a question answering (QA) system.

At step 1205, the process configures the QA System to engage in conversation with a user. At step 1210, the process selects a configuration profile from a set of available profiles. The profiles include a preference to weigh candidate answers based on relevance, to weigh candidate answers based on sentiment, to weigh candidate answers based on both relevance and sentiment, and whether a leader or follower persona desired in the candidate answer. Step 1210 retrieves persona based profiles from data store 1215 and stores the selected persona-based profile in memory area 1220.

At step 1225, the process receives a question from a user. In one embodiment, the user is the entity that selected the persona-based profile by interacting with the QA system so that the selected persona-based profile was selected in step 1210. At step 1230, the process employed by the QA system identifies candidate answers from traditional knowledge base 106 with answers matching the focus and Lexical Answer Type (LAT) of the question that was posed by the user. The candidate answers are stored as potential candidate answers in memory area 1235. At step 1240, the process employed by the QA System identifies a set of conversational candidate answers from a forum-based corpus (forum trees 400) with these candidate answers also matching the focus and the LAT of the question posed by the user. These conversational candidate answers are stored in memory area 1245.

Figure 13:
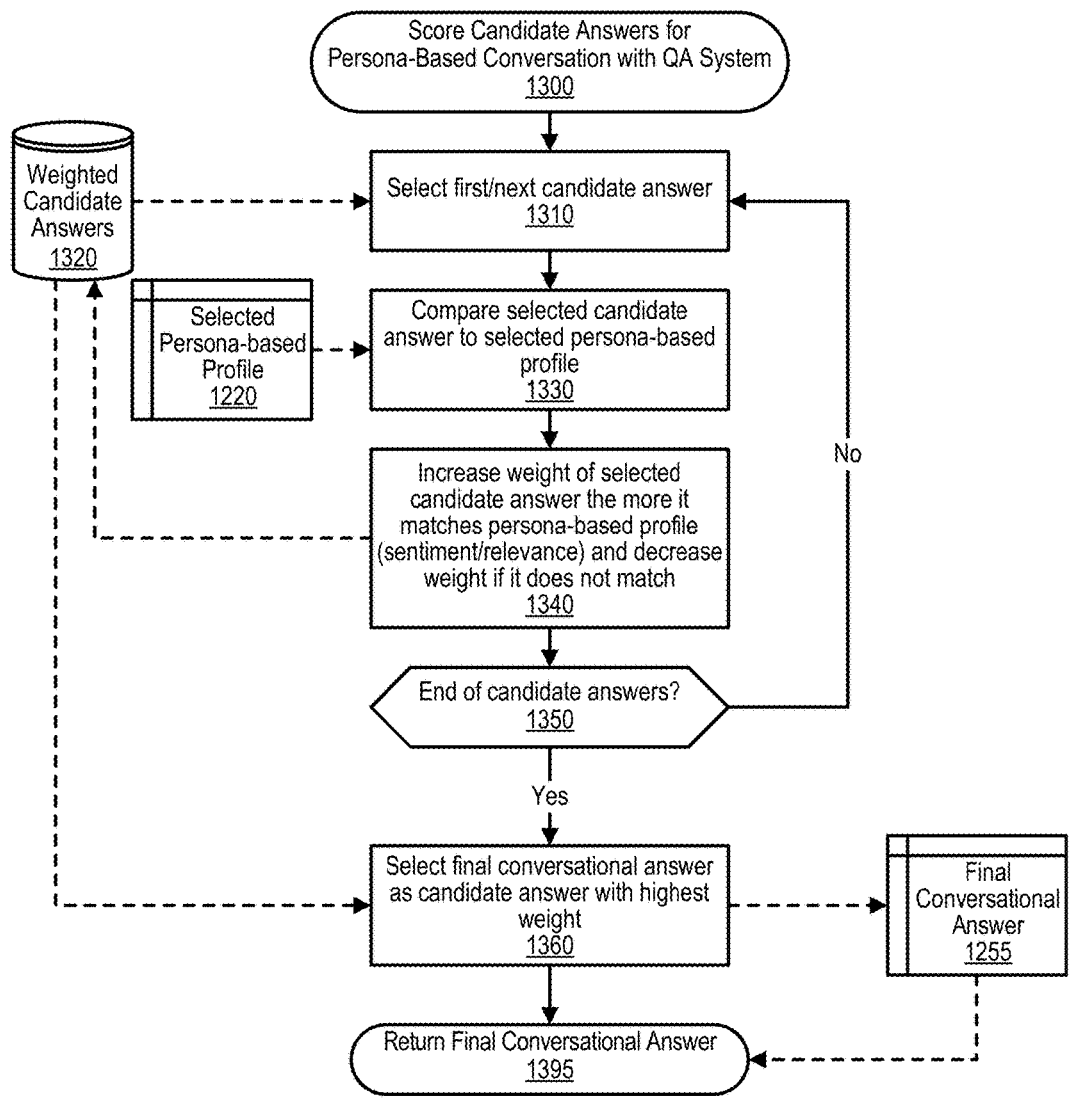
FIG. 13 is an exemplary flowchart depicting steps that score candidate answers for a persona-conversation between a question answering (QA) system and a user of the system.

At predefined process 1250, the process performs the Score Candidate Answers routine (see FIG. 13 and corresponding text for processing details). Predefined process 1250 takes the traditional candidate answers from memory area 1235 and the conversational candidate answers from memory area 1245 to result in one or more final conversational answers that are stored in memory area 1255. At step 1260, the process replies to the user in with the final conversational answer(s) that were stored in memory area 1255. In one embodiment, a conversational tone is used in the reply so that the answer has a conversational feel not unlike the tone used in the user's original question posed to the user in step 1225. FIG. 12 processing thereafter ends at 1295.

In one embodiment, when ingesting corpora that is in the forum or thread form, the main topic is treated as the main context. We identify the series of focus and LAT for the main topic. A focus and LAT are deduced, but maintain the most confident focus and LAT. The Inter-Thread Anaphora Resolution data is utilized to diagnose associations across focuses in the responses to then in combination determine a relevance score for each child response. The child responses are analyzed for similarity based on the focus, LAT and word vocabulary. The sentiment levels for each individual post in relation to the main terms are recorded with each conversation. The positive, neutral, or negative phrase in the statement is determined and a sentiment level is associated with that part of the statement. In addition, the embodiment utilizes prismatic frames with a sentiment level attached to identify categorize those phrases as positive or negative in their relation to the main topic or parent topic.

Example parsing with SVO and sentiment

Overall question (main post): "How is the weather?"

Response post: "The weather is beautiful. It's seventy degrees and clear. A sunny day like today is great for surfing. I'm the best surfer ever, just ask my awesome friends!"

S1: The weather is beautiful. Subject="weather", overall relevance=80%. "beautiful"=subject complement adjective, sentiment=70%

S2: "It's seventy degrees and clear." Anaphora resolution resolves "It's" as the subject="weather", overall relevance=100%. as "seventy degrees" and "clear" are highly correlated to the weather type. sentiment=neutral.

S3: "A sunny day like today is great for surfing." Subject="sunny day", an ontology tells us this is type=weather, so overall relevance=80%. Subject complements "sunny" and "great" lead to sentiment=90%

S4a: "I'm the best surfer ever." Subject=I, I is type=person, no relevance to question, this subject-verb-object (SVO) is not considered.

S4b: "Just ask my awesome friends!" In this command structure, the implied subject is "you", type=person, no relevance to this question, this SVO is not considered.

Thus, only the first three sentences are considered in scoring the response (S1, S2, and S3). This response will be scored with high relevance and medium-high sentiment.

Note that a generic sentiment scoring algorithm would have given this response a very high sentiment, as the fourth sentence was overwhelmingly high sentiment. However, the high sentiment was not related to the topic at hand, so our algorithm disregards it.

Below is a second example forum thread ingestion. A forum thread appears as follows. (Responses are marked with Rn, nested responses with RnRm.). Inter-Thread Anaphor Resolution (ITAR) is used to resolve anaphors.

TOPIC: "What's the weather like where you are?" (LAT=WeatherConditions)

R1: "It's sunny and 70 degrees with a slight breeze" (ITAR to "The weather is sunny and 70 degrees with a slight breeze", Persona="Leader"), (relevant=100% from three weather terms of sunny/70 degrees/slight breeze, sentiment=5)

*R2: "It's a beautiful 70 degrees and I'm going to the beach!" (ITAR to "The weather is a beautiful 70 degrees and I'm going to the beach!" Persona="Leader") (relevant=90% from two weather terms of beautiful/70 degrees, overall sentiment=8, beautiful 70 degrees sentiment=9, I'm going to the beach sentiment=7)

**R2R1 "Here too! I can't wait to get some surfing in!" (ITAR to 'The weather is beautiful here too and I'm going to the beach! I'm going to the beach!') (ITAR Here also, I cannot wait to get some surfing in! "Persona="Leader") (relevant=20%, sentiment=9) (relevant="20%, sentiment=5)

***R2R1R1 "I love surfing!" (relevance to Topic=0%, sentiment=7, relevance to Parent=90%, Persona="Follower")

* R3: "Who cares, I never go outside" (relevant=10%, sentiment=1, Persona="Leader")

* R4: "I love it!!!" (relevant=10%, sentiment=10)

FIG. 13 is an exemplary flowchart depicting steps that score candidate answers for a persona-conversation between a question answering (QA) system and a user of the system. FIG. 13 processing commences at 1300 and shows the steps taken by a process that performs a routine that scores candidate answers for a persona-based conversation with a question answering (QA) system. At step 1310, the process selects the first candidate answer from a set of weighted candidate answers stored in data store 1320. Weighted candidate answers 1320 include both the candidate answers stored in memory area 1235 in FIG. 12 as well as the conversational candidate answers stored in memory area 1245 in FIG. 12.

At step 1330, the process compares the selected candidate answer to the selected persona-based profile that was previously stored in memory area 1220. At step 1340, the process increases the weight of the selected candidate answer the more it matches the selected persona-based profile (sentiment/relevance) and decreases the weight the more it does not match the selected persona-based profile. The process determines as to whether the end of the set of candidate answers has been reached (decision 1350). If the end of the set of candidate answers has not yet been reached, then decision 1350 branches to the 'no' branch which loops back to step 1310 to select and process the next candidate answer from data store 1320. This looping continues until all of the candidate answers have been processed, at which point decision 1350 branches to the 'yes' branch for further processing. At step 1360, the process selects the final conversational answer, or answers, as the candidate answer(s) with the highest weight after taking into account the persona-based profile that has been selected. The final conversational candidate answer(s) are stored in memory area 1255. FIG. 13 processing thereafter returns to the calling routine (see FIG. 12) at 1395.

Figure 14:
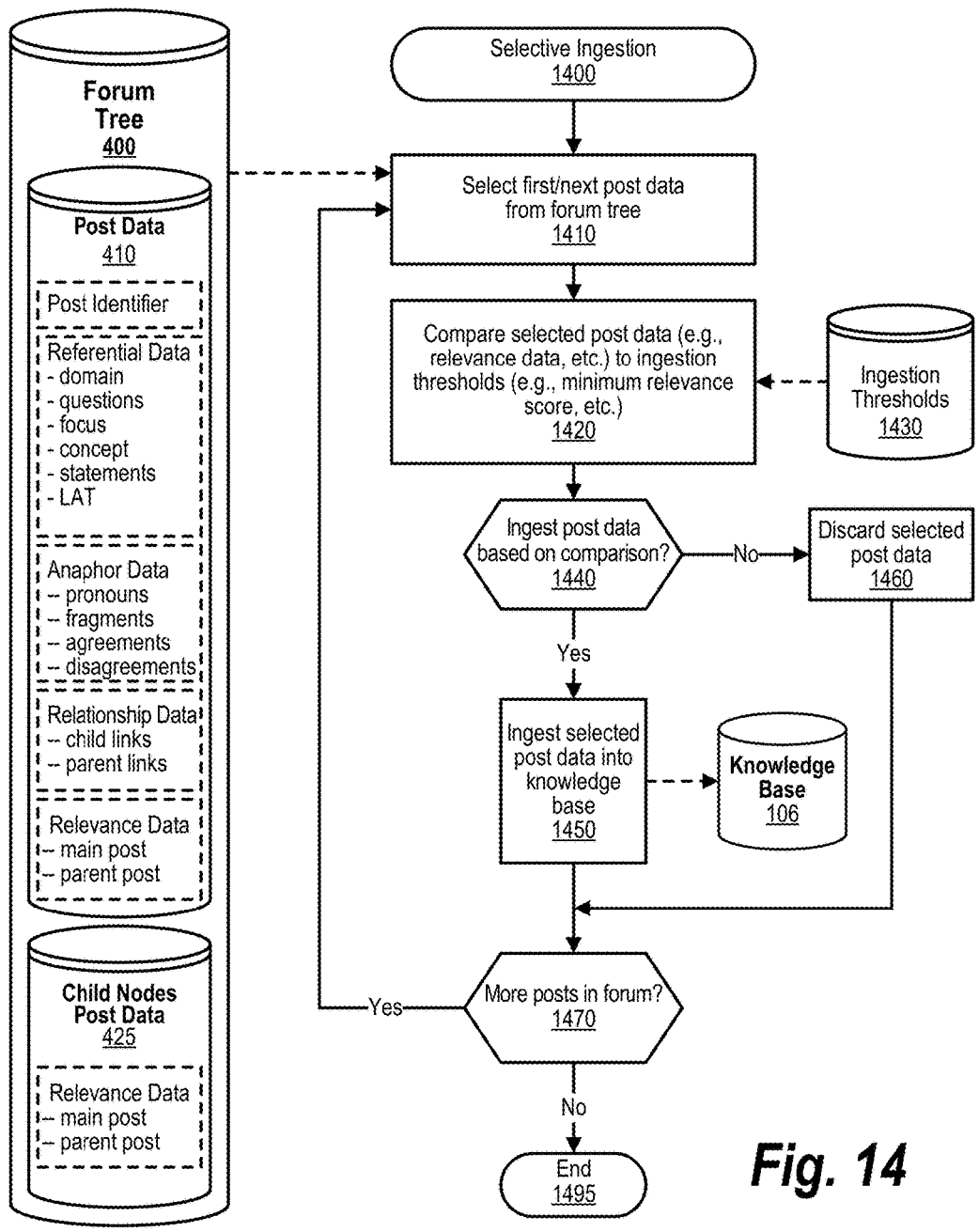
FIG. 14 is an exemplary flowchart depicting steps that selectively ingest post data from a forum into a corpus utilized by a question answering (QA) system.

FIG. 14 is an exemplary flowchart depicting steps that selectively ingest post data from a forum into a corpus utilized by a question answering (QA) system. FIG. 14 processing commences at 1400 and shows the steps taken by a process that performs a routine that selectively ingests post data to a knowledge base utilized by a question answering (QA) system. At step 1410, the process selects the first set of post data from forum tree 400.

At step 1420, the process compares the selected post data (e.g., relevance data, sentiment data, etc.) to ingestion thresholds (e.g., minimum relevance score, minimum sentiment score, etc.). The ingestion thresholds are retrieved from data store 1430. The process determines as to whether to ingest the selected post data based on comparison performed in step 1420 (decision 1440). If the determination is to ingest the selected post data based on comparison, then decision 1440 branches to the 'yes' branch whereupon, at step 1450, the process ingests the selected post data into knowledge base 106. The post data includes the text of the post, the referential data of the post (the domain of the post, questions posed in the post, the focus of the post, the concept of the post, statements made in the post, and the Lexical Answer Type (LAT) of the post). The post data also includes resolved anaphor data such as resolved pronoun type anaphors, resolved fragment type anaphors, and resolved agreement or disagreement type anaphors. The post data further includes child and parent links to the selected post, and relevance data such as relevance and sentiment scores of the post. In one embodiment, the post data also includes leadership data found for the post, relevance data found for the post, and sentiment data found for the post.

On the other hand, if the determination is to avoid ingestion of the selected post data based on the comparison performed in step 1420, then decision 1440 branches to the 'no' branch. At step 1460, the process discards the selected post data in inhibits ingestion of the post data into knowledge base 106.

The process determines as to whether there are more posts in the forum or thread that need to be processed (decision 1470). If there are more posts in the forum or thread that need to be processed, then decision 1470 branches to the 'yes' branch which loops back to select and process the next post from post data 410 as described above. This looping continues until all of the posts from post data 410 have been processed, at which point decision 1470 branches to the 'no' branch and the selective ingestion process ends at 1495.

Figure 15:
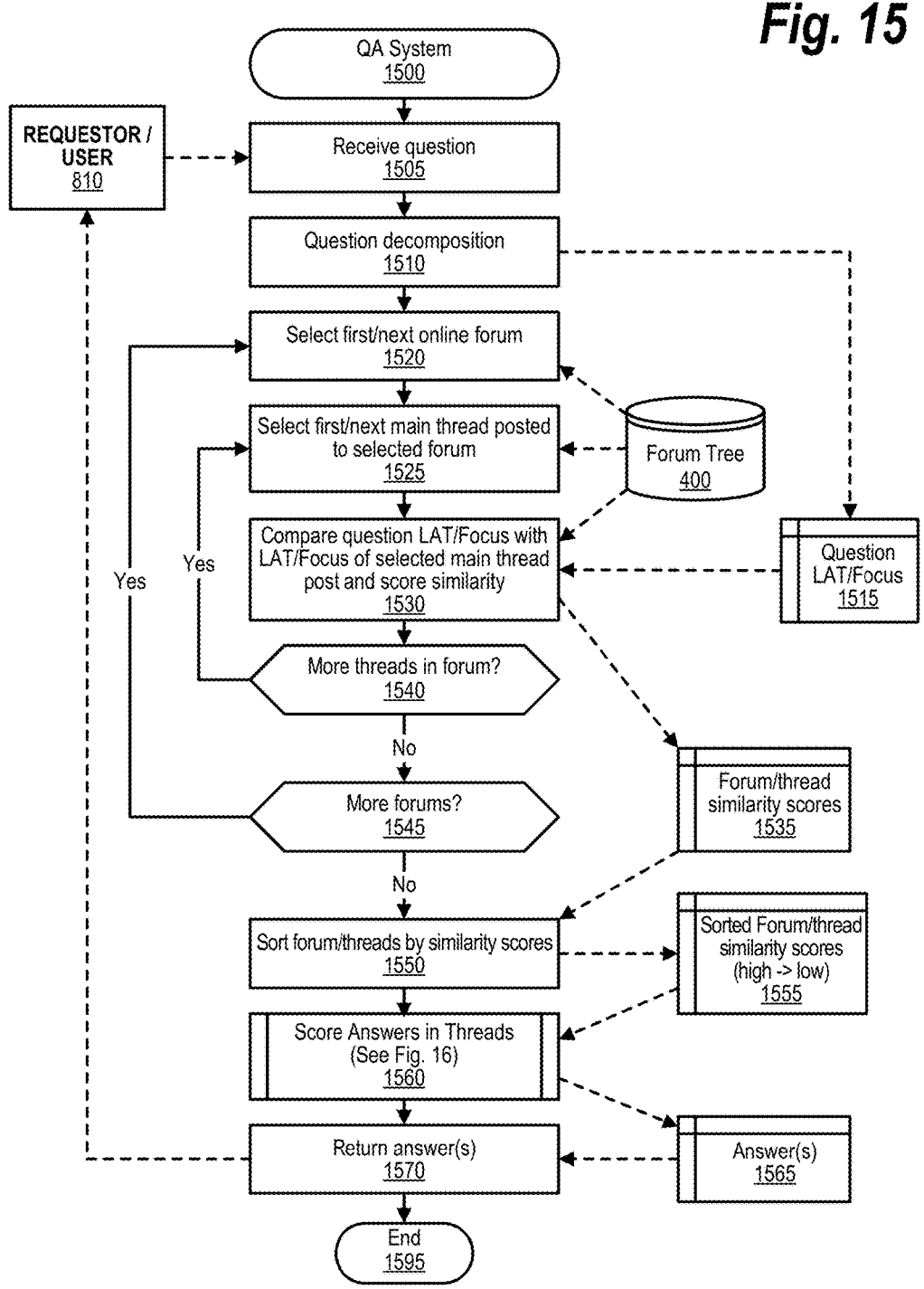
FIG. 15 is an exemplary flowchart depicting steps that answer questions in a question answering (QA) system using candidate answers derived from scored answers found in threads.

FIG. 15 is an exemplary flowchart depicting steps that answer questions in a question answering (QA) system using candidate answers derived from scored answers found in threads. FIG. 15 processing commences at 1500 and shows the steps taken by a process that performs a routine that determines a correct answer based on information obtained from a forum thread. At step 1505, the process receives a question from requestor 810. Requestor 810 may be a user of the QA system or an automated requestor. At step 1510, the process performs question decomposition that identifies the lexical answer type (LAT) and focus of the question submitted by the requestor. The LAT and focus are stored in memory area 1515.

At step 1520, the process selects the first online forum/thread from the ingested forums and threads included in forum tree data store 400. At step 1525, the process selects the first main thread that was posted to the selected forum. During previous ingestion of the forum/thread, the LAT and focus of the posts, including the main post, were identified and stored as metadata in forum tree 400. At step 1530, the process compares the LAT/focus of the question posed by the requestor with the LAT/focus of the selected main post from the selected thread and the process scores the similarity. For example, if the requestor asked "who was the best batter in MLB in 2014?" then the LAT/focus would match threads where the main post dealt with major league baseball, batting statistics, and the like. Main posts that do not match the question's LAT/focus would receive low score, while main posts that focus on MLB, batting statistics, and the like would receive higher scores. A main post that is exactly like, or substantially similar to, the requestor's question would likely receive the highest score. The scores resulting from the comparison are stored in memory area 1535.

The process determines as to whether there are more threads in the forum to process (decision 1540). If there are more threads in the forum to process, then decision 1540 branches to the 'yes' branch which loops back to select and compare the main post from the next thread. This looping continues until there are no more threads in the forum to process, at which point decision 1540 branches to the 'no' branch for further processing. The process next determines as to whether there are more forums in forum tree 400 to process (decision 1545). If there are more forums in the forum tree to process, then decision 1545 branches to the 'yes' branch which loops back to select the next forum from forum tree 400 and process the threads included in the forum as described above. This looping continues until there are no more forums to process, at which point decision 1545 branches to the 'no' branch for further processing.

At step 1550, the process sorts the similarity scores of the forums and threads identified by the processing described above from high scores to low scores with high scores being associated with threads found to be more similar to the question posed by the requestor. The sorted similarity scores are stored in memory area 1555. At predefined process 1560, the process performs the Score Answers in Threads routine (see FIG. 16 and corresponding text for processing details). Predefined process 1560 traverses the threads identified with high similarity scores from memory area 1555 and scores posts found in such threads to discover one or more answers that are returned in memory area 1565. At step 1570, the process returns the one or more answers from memory area 1565 to requestor 810. Processing thereafter ends at 1595.

Figure 16:
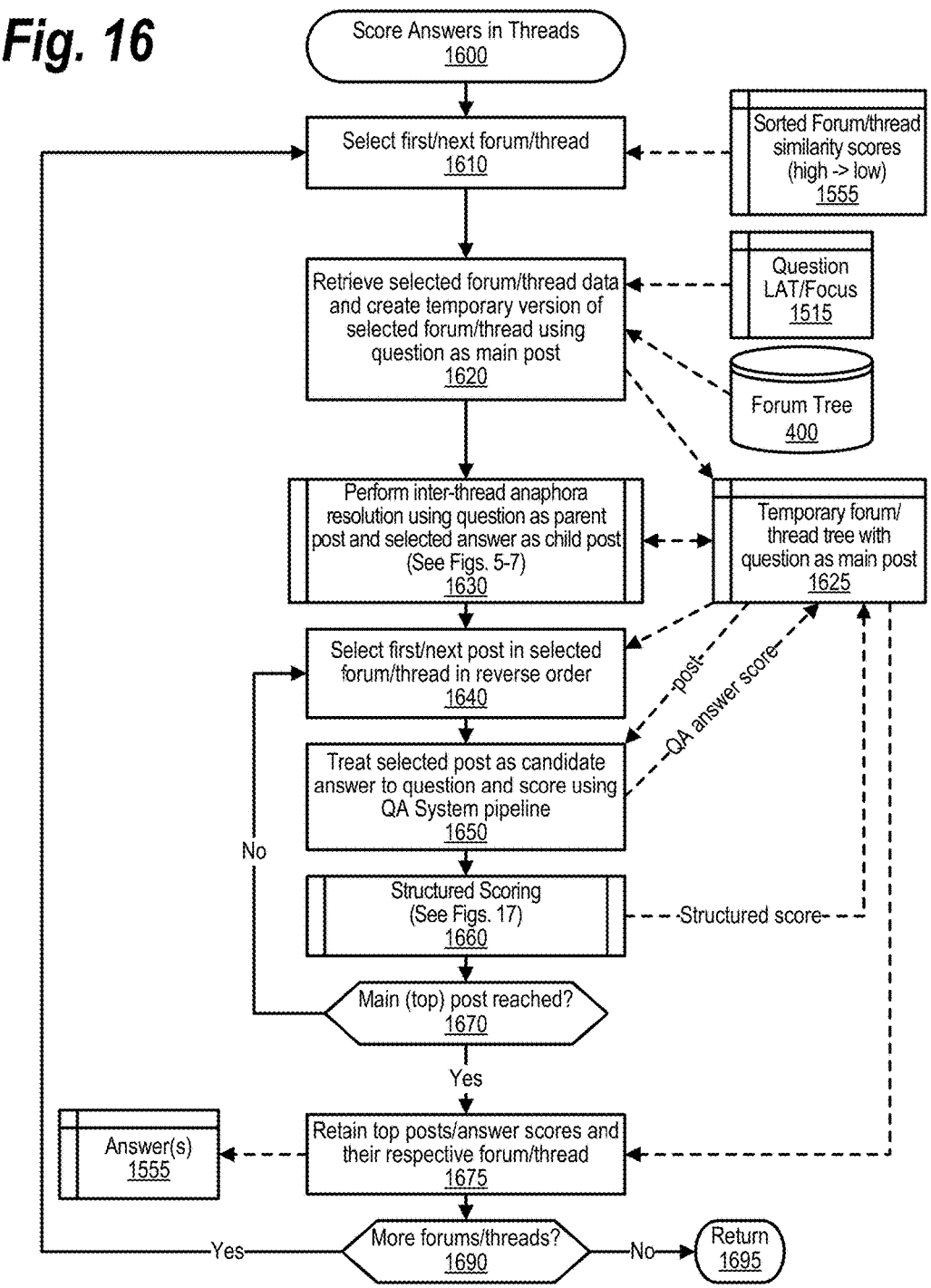
FIG. 16 is an exemplary flowchart depicting steps that score candidate answers found in threads using question answering (QA) system pipeline.

FIG. 16 is an exemplary flowchart depicting steps that score candidate answers found in threads using question answering (QA) system pipeline. FIG. 16 processing commences at 1600 and shows the steps taken by a process that performs a routine that scores answers found in posts of threads.

At step 1610, the process selects the highest scored thread from memory area 1555 with the highest scored thread being the thread with a main post that was found to be most similar to the question submitted by the requestor. At step 1620, the process retrieves data pertaining to the selected thread from forum tree 400 along with the question's LAT/focus from memory area 1515 and creates a temporary version of the selected thread using the question posed by the requestor as the main post of the thread rather than the actual main post of the thread. The temporary version of the thread with the substituted main post is stored in memory area 1625.

At predefined process 1630, the process performs the inter-thread anaphora resolution routine using the question posed by the requestor as the main parent post and selected answer being derived from child posts in the thread (see FIGS. 5-7 and corresponding text for processing details). The anaphora resolution data identified by predefined process 1630 is stored in memory area 1625. At step 1640, the process selects the first post from the selected thread in reverse order after the selected thread has had anaphora resolution processing performed.

The posts are selected from memory area 1625 that now has anaphora resolution data included. At step 1650, the process treats the selected (child) post as the candidate answer to the question posed by the requestor and scores the candidate answer using the QA System pipeline. The score generated by the QA System pipeline is stored as metadata to the child post in memory area 1625. At predefined process 1660, the process performs the Structured Scoring routine (see FIG. 17 and corresponding text for processing details). During structured scoring, the system identifies scoring included in the other posts of the thread that, for example, "like" or "up-vote", the selected post as providing quality information or answer data. The structured score resulting from predefined process 1660 is stored in memory area 1625.

The process determines as to whether the main, or topmost, post has been reached (decision 1670). If the main, or topmost, post has not been reached, then decision 1670 branches to the 'no' branch which loops back to select and process the next post from the thread in reverse order until the topmost post is reached. When the main, or topmost, post has been reached, then decision 1670 branches to the 'yes' branch and processing continues. At step 1675, the process retains top posts from the selected temporary thread based on the respective answer scores. The top scored posts are considered candidate answers to the question posed by the requestor and these candidate answers are stored in memory area 1555. In one embodiment, a threshold is used so that only those candidate answers with a sufficiently high score are retained in memory area 1555.

The process determines as to whether there are more threads to process (decision 1690). If there are more threads to process, then decision 1690 branches to the 'yes' branch which loops back to select and process the next thread and its posts as described above. This looping continues until there are no more threads to process, at which point decision 1690 branches to the 'no' branch and processing returns to the calling routine (see FIG. 15) at 1695.

Figure 17:
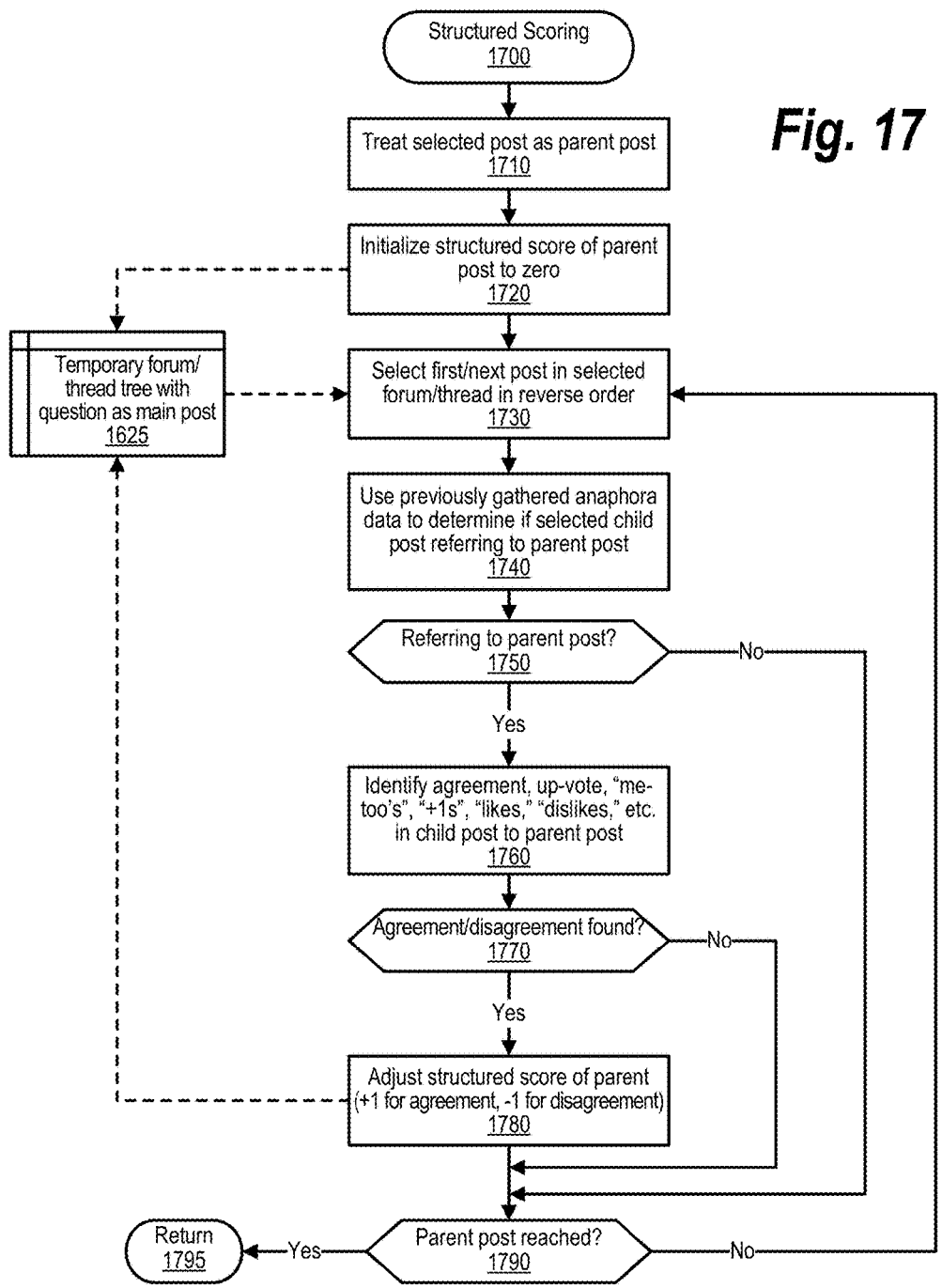
FIG. 17 is an exemplary flowchart depicting steps that score candidate answers found in threads using structured scoring of data found in the thread.

FIG. 17 is an exemplary flowchart depicting steps that score candidate answers found in threads using structured scoring of data found in the thread. FIG. 17 processing commences at 1700 and shows the steps taken by a process that performs a routine that performs structured scoring.

At step 1710, the process treats the selected post as the parent post. At step 1720, the process initializes the structured score of the parent post to zero. The structured score is stored in memory area 1625. At step 1730, the process selects the first post in the selected thread in reverse order from memory area 1625. At step 1740, the process uses the previously gathered anaphora data to determine if the selected child post is referring to the post that is being treated as the parent post. The process determines as to whether the selected post is referring to the parent post (decision 1750). If the selected post is referring to the parent post, then decision 1750 branches to the 'yes' branch to process structured scoring found within the selected "child" post using steps 1760 through 1780. On the other hand, the selected post is not referring to the parent post, then decision 1750 branches to the 'no' branch bypassing steps 1760 through 1780.

At step 1760, the process identifies any agreement, up-vote, "me-too's", "+1s", "likes," "dislikes," etc. found in child post that is referring to agreement or disagreement with the parent post. The process determines as to whether any agreement or disagreement was found in the child post referring to the parent post (decision 1770). If an agreement or a disagreement was found, then decision 1770 branches to the 'yes' branch to perform step 1780. On the other hand, if no agreement or disagreement was found, then decision 1770 branches to the 'no' branch bypassing step 1780. At step 1780, the process adjusts the structured score of the selected parent post accordingly (e.g., increment, or "+1" if agreement found, decrement or "−1" if disagreement found, etc.). The adjusted structure score is stored in memory area 1625.

The process determines as to whether the parent post has been reached (decision 1790). If the parent post has not been reached, then decision 1790 branches to the 'yes' branch which loops back to select the next post in the thread until the parent post has been reached. When the parent post has been reached, then decision 1790 branches to the 'no' branch and processing returns to the calling routine (see FIG. 16) at 1795.

Figure 18:
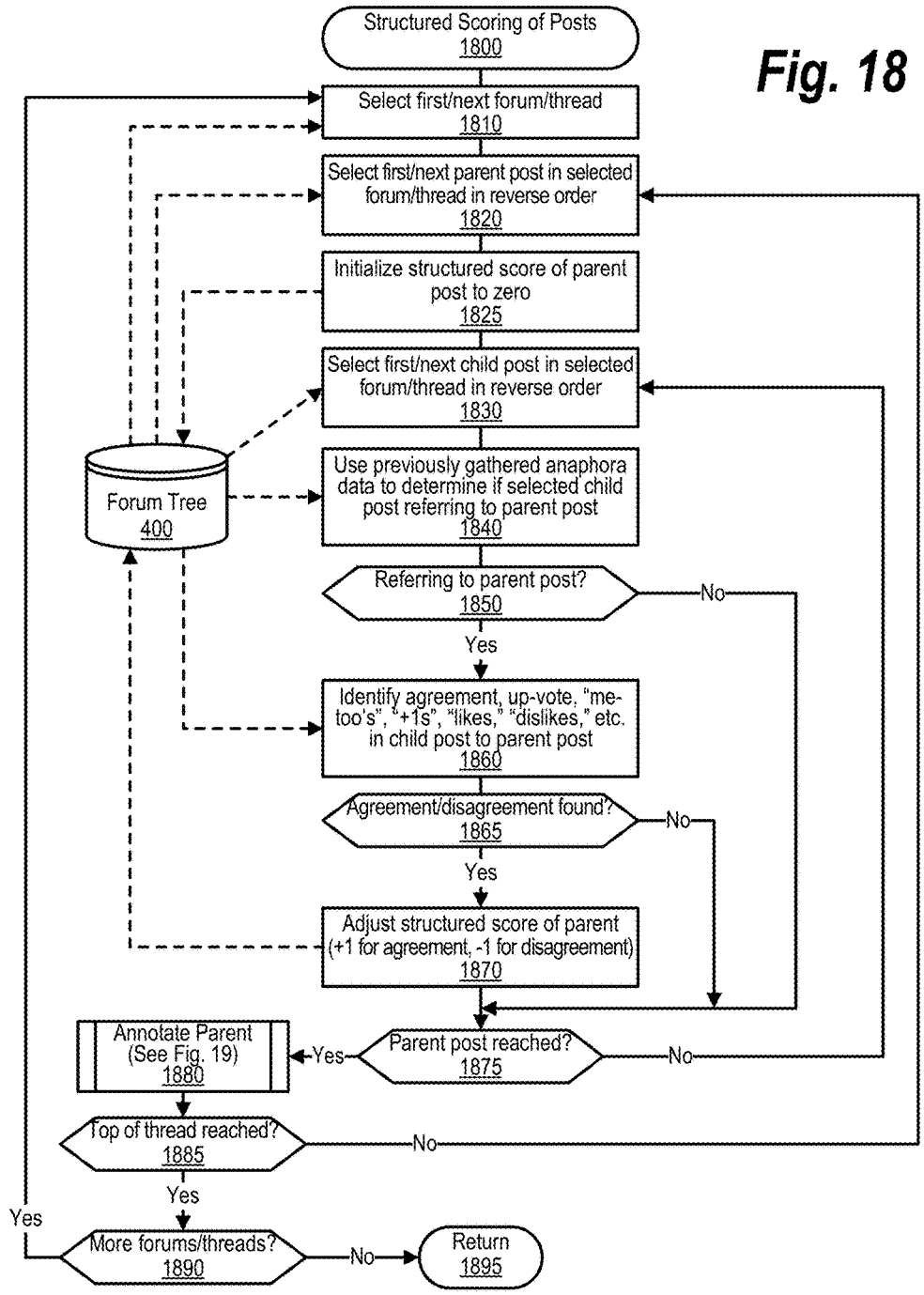
FIG. 18 is an exemplary flowchart depicting steps that perform structured scoring of posts included in threads.

FIG. 18 is an exemplary flowchart depicting steps that perform structured scoring of posts included in threads. FIG. 18 processing commences at 1800 and shows the steps taken by a process that performs a routine that provides structured scoring of posts included in threads ingested in the QA system. At step 1810, the process selects the first thread from forum tree 400. At step 1820, the process selects the first parent post in the selected thread in reverse order (from the bottom of the thread to the top). Parent and child threads were previously identified during anaphora resolution processing. At step 1825, the process initializes the structured score of parent post to zero. The structured score is stored in forum tree 400 and associated with the selected post.

At step 1830, the process selects the first child post from the selected thread in reverse order (from the bottom of the thread to the selected parent post). At step 1840, the process uses the previously gathered anaphora data to determine if the selected child post refers to the selected parent post. The process determines as to whether this child post refers to the selected parent post (decision 1850). If this child post refers to the selected parent post, then decision 1850 branches to the 'yes' branch to perform steps 1860 through 1870. On the other hand, if this child post does not refer to the selected parent post, then decision 1850 branches to the 'no' branch bypassing steps 1860 through 1870.

At step 1860, the process identifies any agreement, up-vote, "me-too's", "+1s", "likes," "dislikes," etc. found in child post that is referring to agreement or disagreement with the parent post. The process determines as to whether any agreement or disagreement was found in the child post referring to the parent post (decision 1870). If an agreement or a disagreement was found, then decision 1870 branches to the 'yes' branch to perform step 1880. On the other hand, if no agreement or disagreement was found, then decision 1870 branches to the 'no' branch bypassing step 1880. At step 1880, the process adjusts the structured score of the selected parent post accordingly (e.g., increment, or "+1" if agreement found, decrement or "−1" if disagreement found, etc.). The adjusted structure score is stored in forum tree 400.

The process determines as to whether the selected parent post has been reached (decision 1875). If the selected parent post has not been reached, then decision 1875 branches to the 'no' branch which loops back to select the next post from the thread until the parent post has been reached. This looping continues until the selected parent post has been reached, at which point decision 1875 branches to the 'yes' branch for further processing. At predefined process 1880, the process performs the Annotate Parent routine (see FIG. 19 and corresponding text for processing details). The Annotate Parent routine adds metadata, or annotations, to the parent post as stored in forum tree 400 so that such annotations might be visible to users that view the post with a user interface described in FIG. 20.

The process determines as to whether the top of the thread has been reached (decision 1885). If the top of the thread has not been reached, then decision 1885 branches to the 'no' branch which loops back to select the next parent post at step 1820 and perform the processing described above. This looping continues until the top of the thread has been reached, at which point decision 1885 branches to the 'yes' branch for further processing. The process determines as to whether there are more forums and/or threads in forum tree 400 to process (decision 1890). If there are more forums and/or threads in the forum tree to process, then decision 1890 branches to the 'yes' branch which loops back to select and process the next thread as described above. This looping continues until all of the threads in forum tree 400 have been processed, at which point decision 1890 branches to the 'no' branch and processing returns to the calling routine (see FIG. 17) at 1895.

Figure 19:
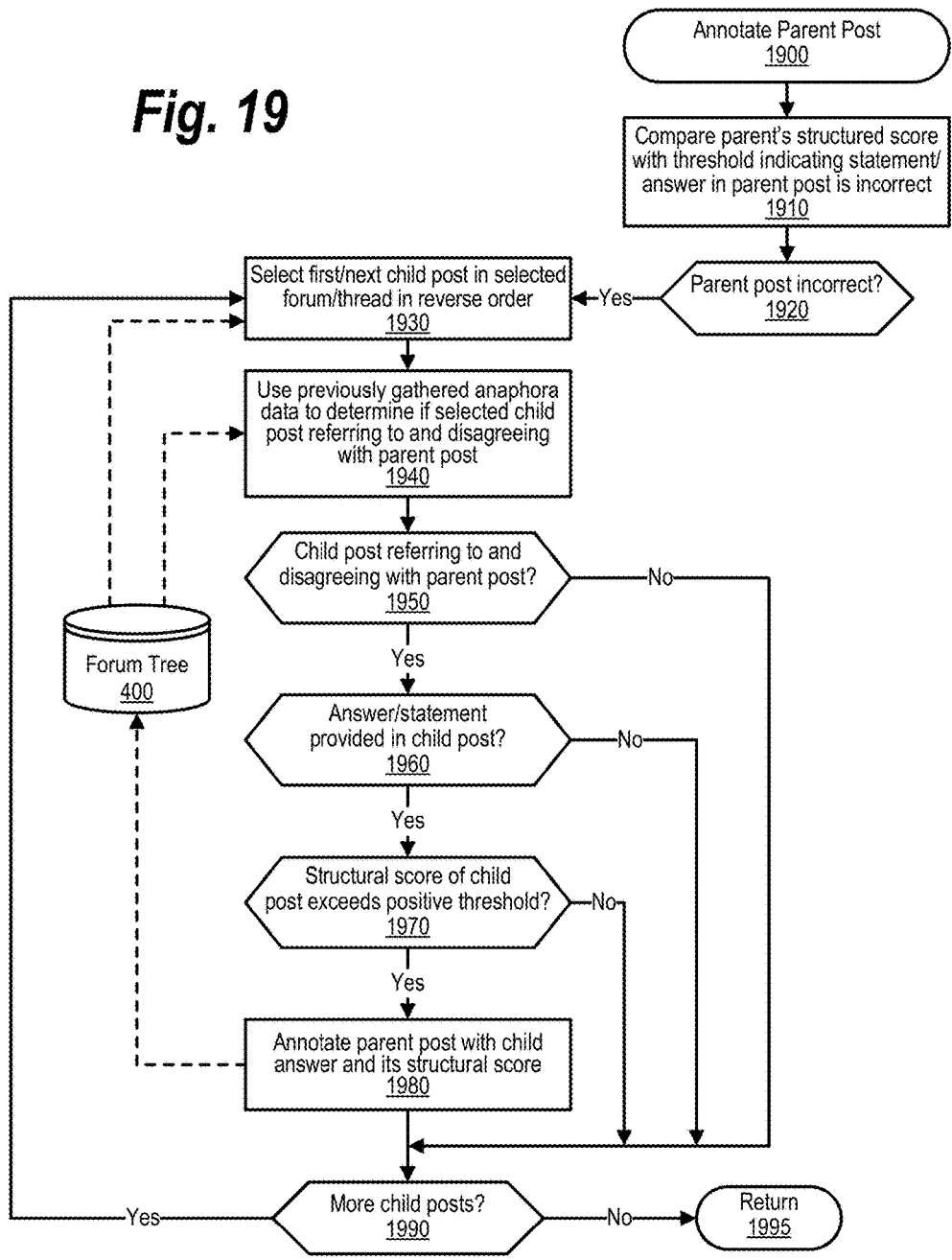
FIG. 19 is an exemplary flowchart depicting steps that annotate parent posts with gathered structured scoring data.

FIG. 19 is an exemplary flowchart depicting steps that annotate parent posts with gathered structured scoring data. FIG. 19 processing commences at 1900 and shows the steps taken by a process that performs a routine that annotates a parent post stored in forum tree 400. At step 1910, the process compares the parent's structured score with a threshold that indicates whether the answer included in the parent post is incorrect. The process determines as to whether the parent post is incorrect (decision 1920). If the parent post is incorrect, then decision 1920 branches to the 'yes' branch for further processing. On the other hand, if the parent post is correct, then decision 1920 branches to the 'no' branch and processing returns at 1925. In one embodiment, parent posts found to be correct can also be annotated using steps 1930 through 1990 to annotate the parent post with the support found in the child posts indicating that the parent post is correct.

At step 1930, the process selects the first child post from the selected thread in reverse order (bottom of the thread to the parent post). At step 1940, the process uses previously gathered anaphora data to determine if the selected child post refers to the parent post and disagrees with such post. The process determines as to whether the child post refers to and disagrees with the parent post (decision 1950). If the child post refers to and disagrees with the parent post, then decision 1950 branches to the 'yes' branch to process steps 1960 through 1980. On the other hand, if the child post either does not refer to the parent post or does not disagree with the parent post, then decision 1950 branches to the 'no' branch bypassing steps 1960 through 1980.

The process determines as to whether an answer or statement was included in the child post (decision 1960). If an answer or statement was included in the child post, then decision 1960 branches to the 'yes' branch to perform steps 1970 through 1980. On the other hand, if an answer or statement was not included in the child post, then decision 1960 branches to the 'no' branch bypassing steps 1970 through 1980.

The process determines as to whether the structural score of the selected child post exceeds a positive threshold that indicates satisfactory support with the answer or statement included in the child post (decision 1970). If the structural score of the selected child post exceeds the positive threshold that indicates satisfactory support with the answer or statement included in the child post, then decision 1970 branches to the 'yes' branch whereupon, at step 1980, the selected parent post is annotated with the selected child answer and its structural score (support). On the other hand, if the structural score of the selected child post does not exceeds the positive threshold that indicates satisfactory support with the answer or statement included in the child post, then decision 1970 branches to the 'no' branch bypassing step 1980.

The process determines as to whether there are more child posts to process for the selected parent post (decision 1990). If there are more child posts to process for the selected parent post, then decision 1990 branches to the 'yes' branch which loops back to select and process the next child post in the thread. This looping continues until there are no more child posts to process, at which point decision 1990 branches to the 'no' branch and processing returns to the calling routine (see FIG. 18) at 1995.

Figure 20:
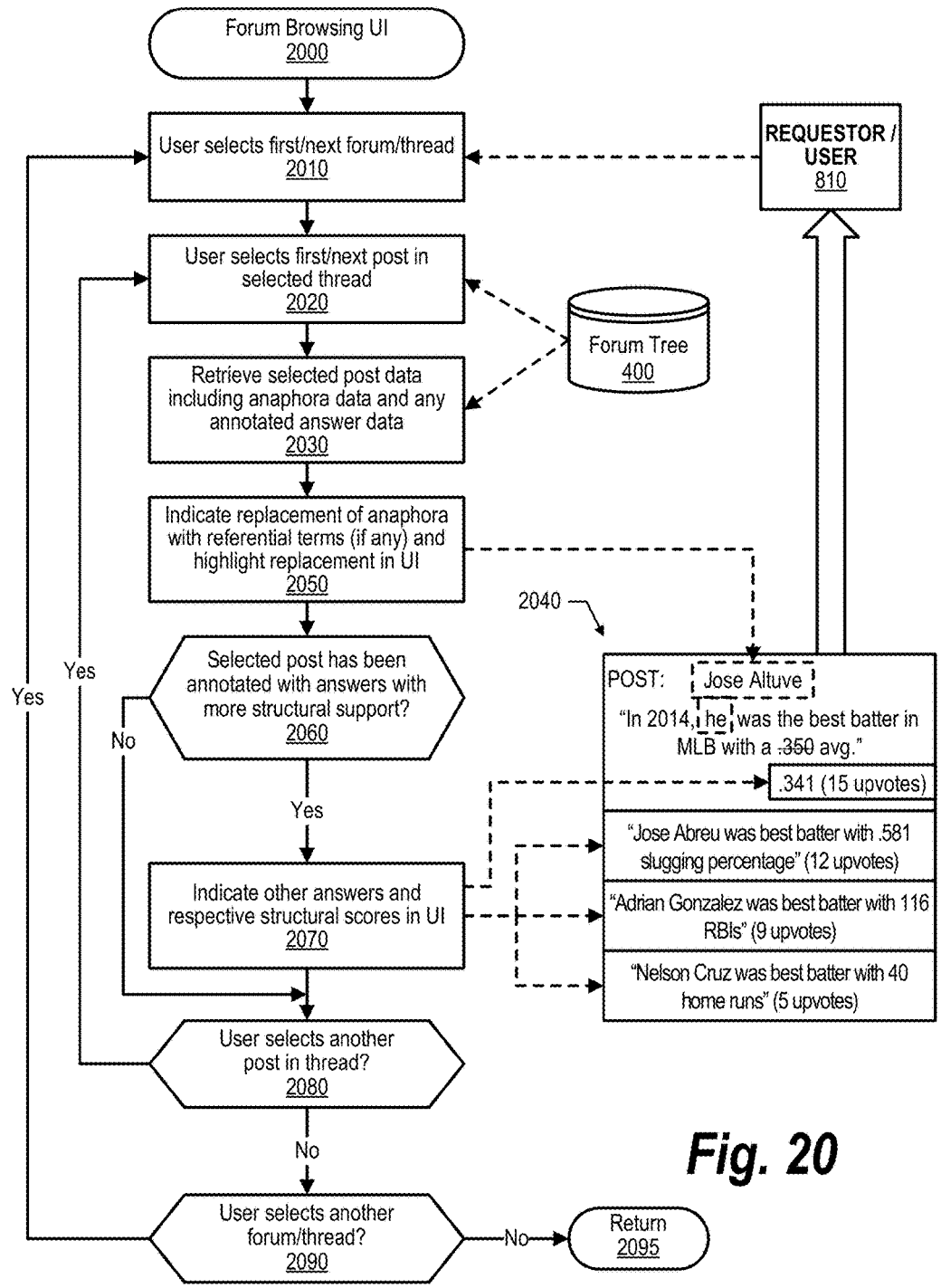
FIG. 20 is an exemplary flowchart depicting steps that provide annotation and structural scoring of posts viewed in a user interface.

FIG. 20 is an exemplary flowchart depicting steps that provide annotation and structural scoring of posts viewed in a user interface. FIG. 20 processing commences at 2000 and shows the steps taken by a process that performs a routine that provides a forum browsing user interface (UI). At step 2010, the process selects first forum/thread from forum tree 400. At step 2020, the process selects the first desired post in the selected thread. At step 2030, the process retrieves the selected post data from forum tree 400 with the post data including anaphora data and any annotated answer data provided during the processing shown in FIG. 19.

At step 2050, the process indicates any replacement of anaphora with referential terms (if any) and also highlights the replacement in the user interface. User interface 2040 shows an example of a post being selected that states that "he" was the best batter in 2014. The UI shows that "he" is anaphorically referring to a player named "Jose Altuve." The process determines as to whether the selected post has been annotated with answers that have sufficient structural support (decision 2060). If the selected post has been annotated with answers that have sufficient structural support, then decision 2060 branches to the 'yes' branch whereupon at step 2070, the process indicates other answers and respective structural scores in the user interface with the other answers and respective structural support being annotations provided to the selected post using the process shown in FIG. 19. Different types of answers or statements might have been provided by child answers. First, a factual statement made in the post that the player had a "0.350" batting average was found to be in dispute with a number of child posts (15 upvotes) stating that the player instead had a "0.341" batting average with such disagreement being shown in the user interface. Next, the statement of "best batter" has been called into question by a number of child posts that disagree that batting average is the best way to determine the best batter. As shown, twelve posts agreed that "slugging percentage" is a better determination of "best batter" with a different player having the highest slugging percentage. Nine posts agreed that "RBIs" is a better determination of "best batter" with a different player having the highest number of RBIs. Finally, five posts agreed that the number of home runs hit is a better determination of "best batter" with a different player having the highest number of home runs. This annotation, therefore, not only informs the user viewing the post using the user interface of factual discrepancies provided by the post, but also provide alternative viewpoints for certain statements or generalities made in the post.

Returning to decision 2060, if the selected post has not been annotated with answers that have sufficient structural support, then decision 2060 branches to the 'no' branch bypassing step 2070. The process determines as to whether the user selects another post in this thread (decision 2080). If the user selects another post in this thread, then decision 2080 branches to the 'yes' branch which loops back to retrieve and display the next post selected by the user with any annotation and anaphora data. On the other hand, if no more posts are selected from this thread, then decision 2080 branches to the 'no' branch for further processing. The process determines as to whether the user selects another forum/thread from the forum tree (decision 2090). If the user selects another forum/thread from the forum tree, then decision 2090 branches to the 'yes' branch which loops back to retrieve post data from the next forum/thread selected by the user. This looping continues until the user is finished using the user interface, at which point decision 2090 branches to the 'no' branch and UI processing ends at 2095.

Figure 21:
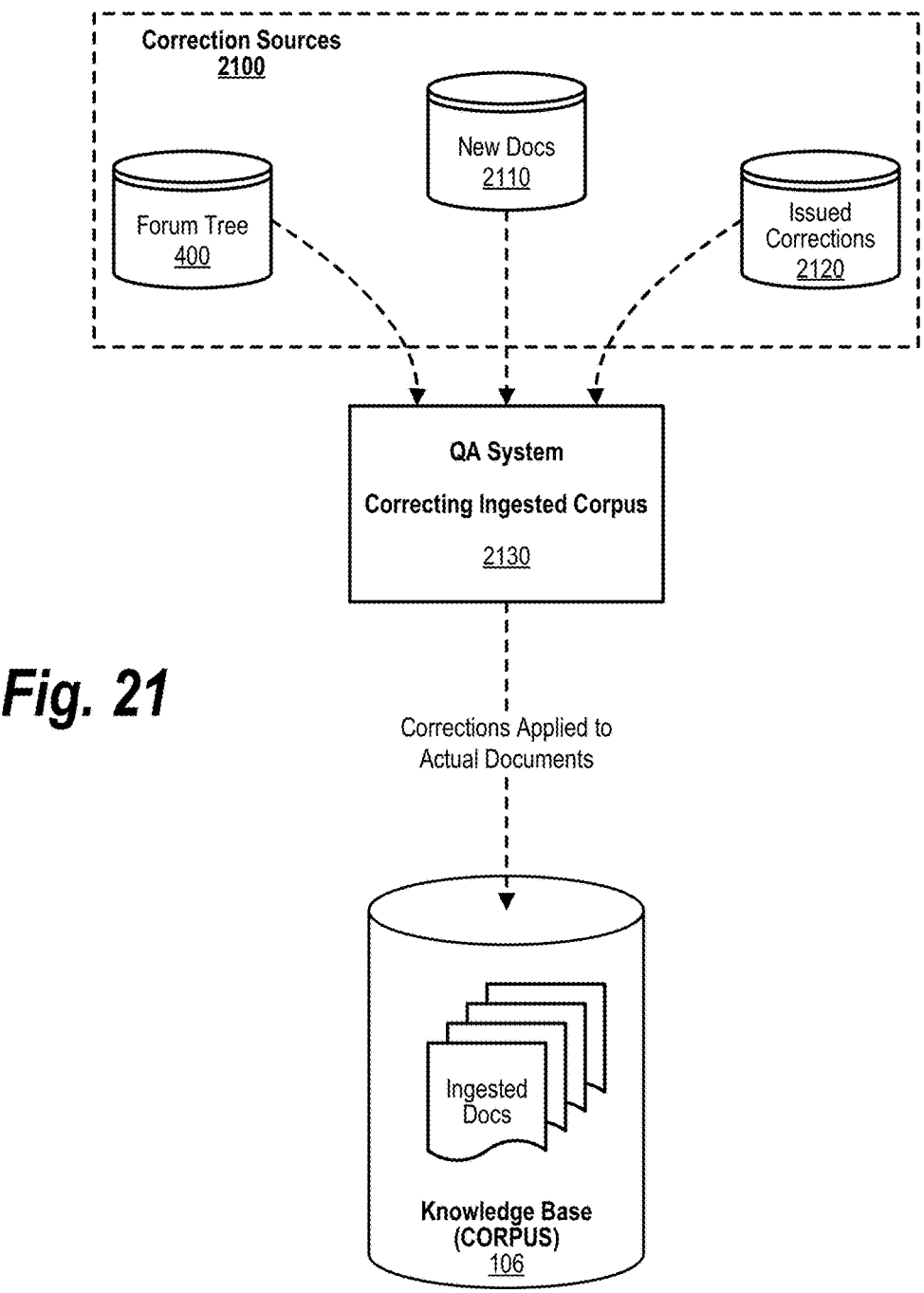
FIG. 21 is an exemplary component diagram depicting components used in applying corrections to an ingested corpus.

FIG. 21 is an exemplary component diagram depicting components used in applying corrections to an ingested corpus. Correction sources 2100 can vary from online forums ingested into the question answering (QA) system in forum tree 400, new documents 2110, and issued corrections 2120. Documents already ingested into corpus 106 may have factual statements that are in error or otherwise incorrect. For example, a newspaper may have published an article that stated that "Jane Doe" was arrested for a particular crime, when in fact "John Doe" was the person arrested.

When the document is ingested into corpus 106 with the incorrect factual statement, a question posed to the QA system, such as "who was arrested for the crime on Main Street in Anywhere, NC last Friday" may erroneously answer as "Jane Doe" unless correction sources are used to correct the incorrect data. For example, a forum related to happenings in Anywhere, NC may have a thread about the arrest with many posts agreeing that John Doe was the person arrested for the crime. Likewise, a different newspaper or article, such as in an online publication, may have been published listing the correct person (John Doe) as being arrested instead of Jane Doe. In addition, the newspaper that originally published the article may issue a "correction" in a subsequent publication and/or online once the error becomes known to the editors and publishers of the newspaper. These correction sources are processed by the QA system process that corrects the ingested corpus (2130). As shown in more detail in FIGS. 22-27, facts and statements in the correction sources are analyzed and compared to the facts and statements included in ingested documents and, when an error is detected, the corrections are applied to the ingested documents in the QA system corpus 106.

Figure 22:
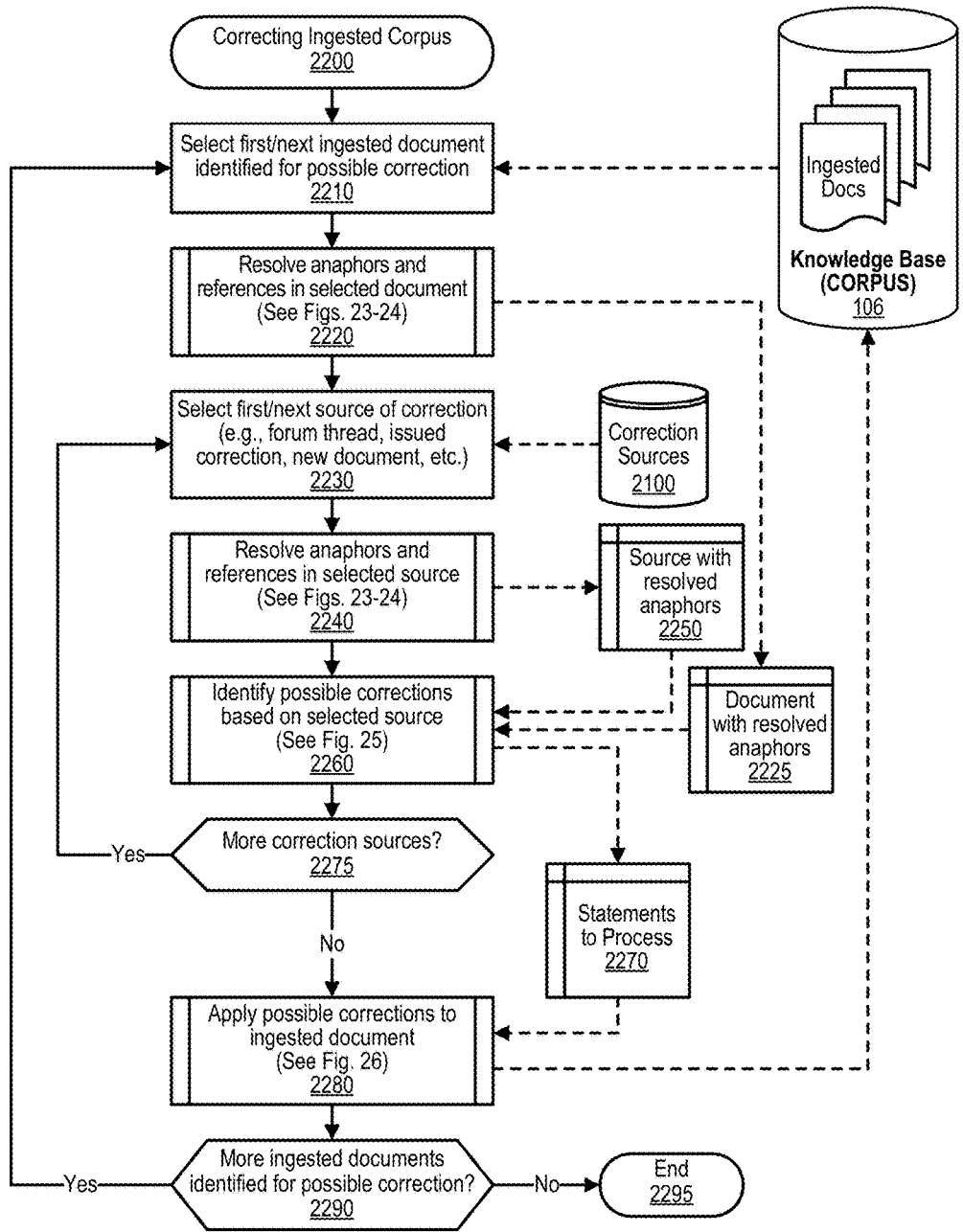
FIG. 22 is an exemplary flowchart depicting high level steps that apply corrections to an ingested corpus.

FIG. 22 is an exemplary flowchart depicting high level steps that apply corrections to an ingested corpus. FIG. 22 processing commences at 2200 and shows the steps taken by a process that performs a routine that corrects documents already ingested in a corpus. At step 2210, the process selects the first ingested document that has been identified for possible correction. Many different approaches can be used to identify documents already ingested that may need correction. All documents of a corpus can be selected, a sampling of documents can be selected, or particular documents can be selected based on criteria such as quality of the publications, errors encountered in QA system processing when such documents were utilized, user complaints about quality of such documents, and the like.

Figure 23:
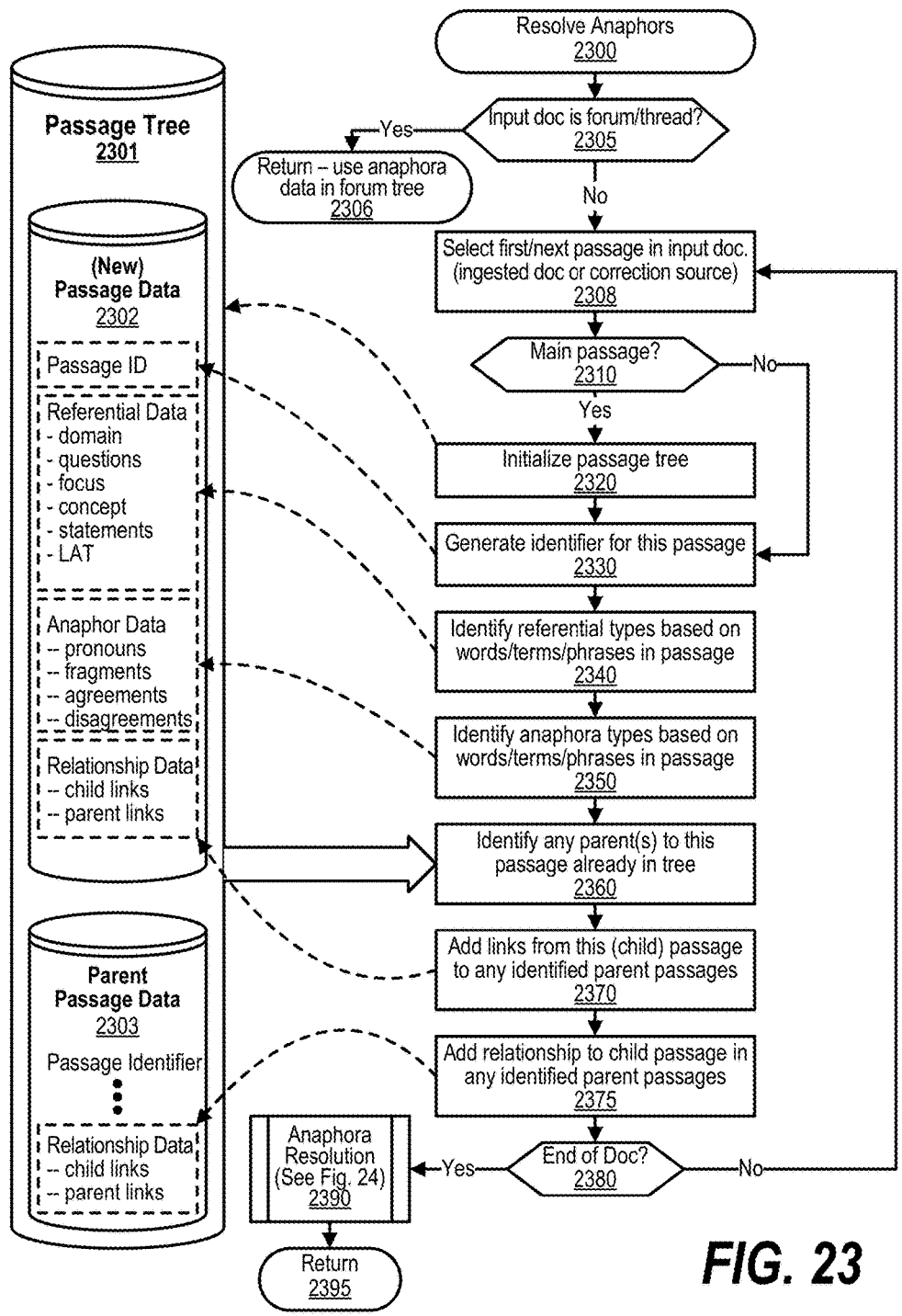
FIG. 23 is an exemplary flowchart depicting steps that resolve anaphors found in documents.
Figure 24:
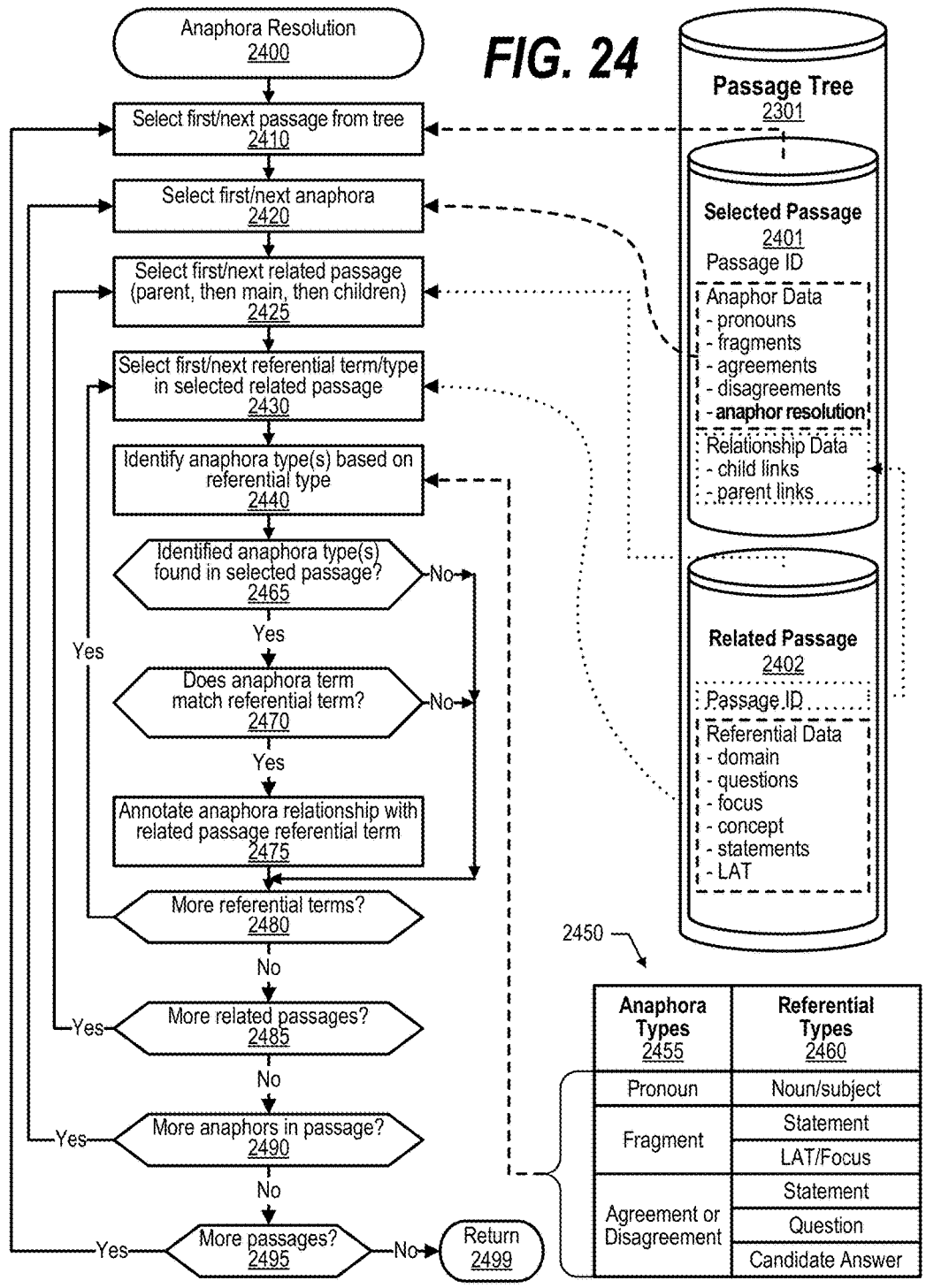
FIG. 24 is an exemplary flowchart depicting further steps used to resolve anaphors found in documents.

At predefined process 2220, the process performs the resolve anaphors and references in selected document routine (see FIGS. 23 and 24 and corresponding text for processing details). The result of predefined process 2220 is the document text with resolved anaphors that are stored in memory area 2225. The resolved anaphors allow a better comparison of the terms in the document with terms found in correction sources.

At step 2230, the process selects the first source of correction data. The correction source might be an ingested forum posts/threads, an issued correction document, a new document, and the like. At predefined process 2240, the process performs the resolve anaphors and references in the selected correction source routine (see FIGS. 23-24 and corresponding text for processing details). Similar to anaphor resolution of the ingested document, anaphor resolution is performed on the correction source so that the terms, facts, and statements included in the correction source can be more accurately compared to the terms, facts, and statements included in the ingested document. The text of the correction source is stored in memory area 2260 along with the correction source's resolved anaphors. At predefined process 2260, the process performs the identify possible corrections based on selected source routine (see FIG. 25 and corresponding text for processing details). During predefined process 2260, the ingested document with resolved anaphors is retrieved from memory area 2225 and compared to the correction source with resolved anaphors from memory area 2250 to identify statements included in the ingested document that may need to be corrected. These statements are stored in memory area 2270.

The process determines as to whether there are more correction sources to process to identify possible errors in the ingested document (decision 2275). If there are more correction sources to process, then decision 2275 branches to the 'yes' branch which loops back to select and process the next correction source as described above. This looping continues until there are no more correction sources to process, at which point decision 2275 branches to the 'no' branch and processing continues.

Figure 26:
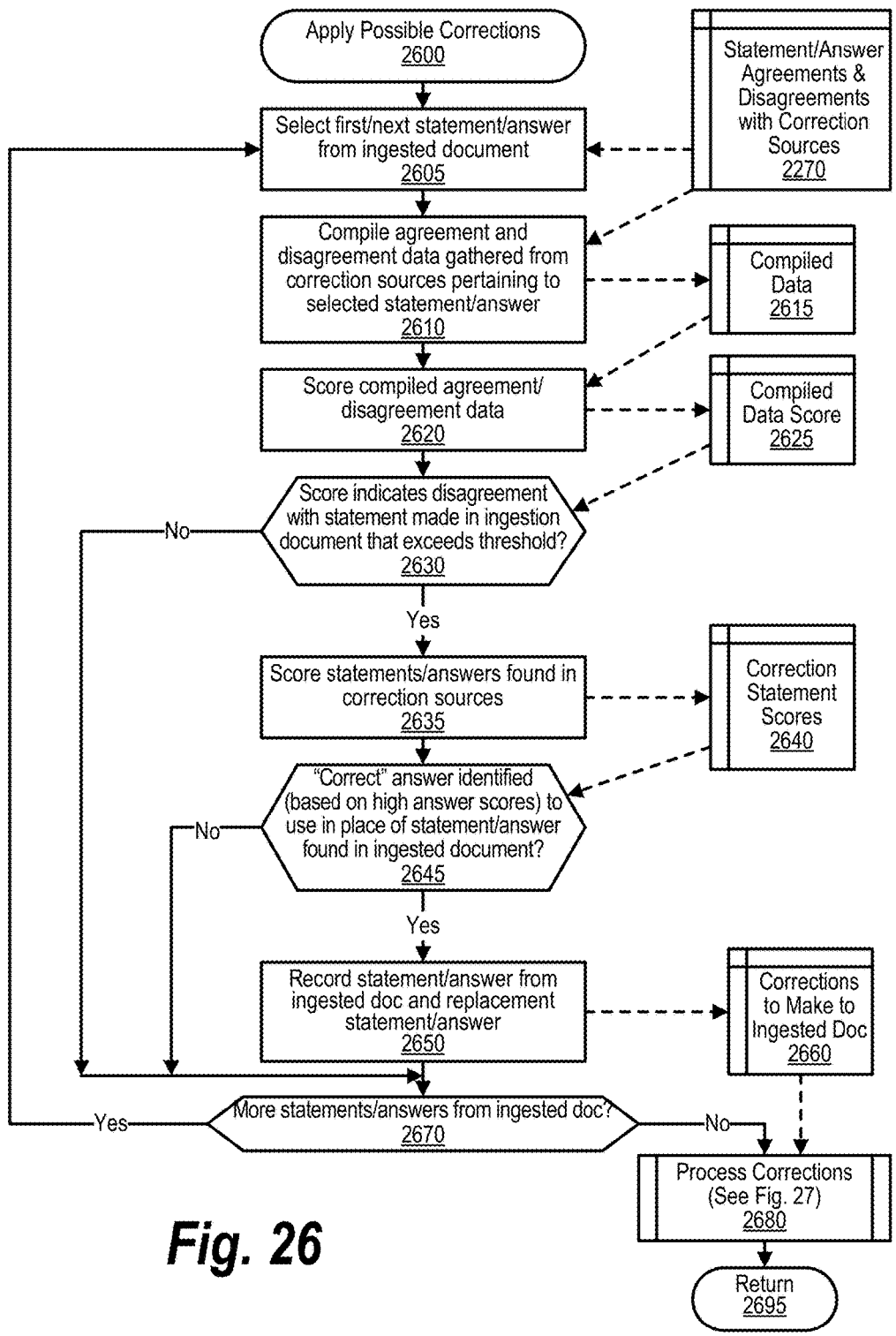
FIG. 26 is an exemplary flowchart depicting steps that apply possible corrections to an ingested document.

At predefined process 2280, the process performs the apply possible corrections to ingested document routine (see FIG. 26 and corresponding text for processing details). During predefined process 2280, the possible corrections identified and stored in memory area 2270 are analyzed to determine which statements, if any, represent corrections to make to the ingested document. Those statements that are deemed to be valid corrections are processed and the ingested document is corrected in the corpus.

The process determines as to whether there are more ingested documents that have been identified for possible correction (decision 2290). If there are more ingested documents that have been identified for possible correction, then decision 2290 branches to the 'yes' branch which loops back to select and process the next identified ingested document. This looping continues until there are no more ingested documents identified for possible correction, at which point decision 2290 branches to the 'no' branch and processing ends at 2295.

FIG. 23 is an exemplary flowchart depicting steps that resolve anaphors found in documents. The processing shown in FIGS. 23 and 24 are used to resolve anaphors in both the ingested document as well as the correction sources. FIG. 23 processing commences at 2300 and shows the steps taken by a process that performs a routine that resolves anaphors found in both the selected ingested document and the various correction source documents. The process determines as to whether the input document is a correction source that is a forum, thread, or post (decision 2305). If the input document is a correction source that is a forum, thread, or post, then decision 2305 branches to the 'yes' branch whereupon, processing returns to the calling routine (see FIG. 22) with a return code indicating that the anaphora data should be retrieved from the forum tree (see Forum Tree 400 in FIG. 21 and throughout FIGS. 3-20). On the other hand, if the input document is not a correction source that is a forum, thread, or post, then decision 2305 branches to the 'no' branch and processing continues. At step 2308, the process selects the first passage from the input document with the input document being either the selected ingested document or a correction source document.

The process determines as to whether the passage being processed is the main passage of the document (decision 2310). If the passage being processed is the main passage of the document, then decision 2310 branches to the 'yes' branch whereupon, at step 2320, the process initializes passage tree 2301 used to store the passage data associated with this document. On the other hand, if the passage being processed is not the main passage of the document, then decision 2310 branches to the 'no' branch bypassing step 2320.

At step 2330, the process generates a unique passage identifier for this passage and adds a record used to store this passage data in passage tree 2301 with new passage data 2302. At step 2340, the process identifies referential types based on words, terms, and phrases found in the passage that is being processed. Referential data can include the domain of the passage, questions posed by the passage, the focus of the passage, any concepts included in the passage, statements made in the passage and the Lexical Answer Type (LAT) of the passage.

At step 2350, the process identifies anaphora types based on the words, terms, and phrases found in passage that is being processed. Types of anaphors include pronoun type anaphors, fragment type anaphors, agreement type anaphors, and statement type anaphors.

At step 2360, the process identifies any parent(s) to this passage that are already included in passage tree 2301. Parent passages include the main passage to the document, the direct parent passage of the document, and any intervening parent (ancestor) passages between the main passage and the direct parent passage. At step 2370, the process adds links from this (child) passage to any identified parent passages that were found in step 2360. At step 2375, the relationships between this passage and parent passages are added to passage data included in data store 2302. Links are added to this passage as links to the parent passages, and in the respective parent passage data (2303) as links to this child passage with data store 2303 being a subset of data store 2302 and shown as a separate data store for illustrative purposes.

A decision is made by the process as to whether the end of the input document has been reached (decision 2380). If the end of the input document has not been reached, then decision 2380 branches to the 'no' branch which loops back to select and process the next passage in the document as described above. This looping continues until the end of the input document has been reached, at which point decision 2380 branches to the 'yes' branch and further anaphora resolution processing is performed at predefined process 2390 (see FIG. 24 and corresponding text for processing details). FIG. 23 processing thereafter returns to the calling routine (see FIG. 22) at 2395.

FIG. 24 is an exemplary flowchart depicting anaphora resolution of terms found in passages of a forum. FIG. 24 processing commences at 2400 and shows the steps taken by a process that performs a routine that resolves anaphors found in a child passage. At step 2410, the process selects the first passage from passage tree 2301. At step 2420, the process selects the first anaphor from the selected passage (if an anaphor exists in the passage). At step 2425, the process selects the first related passage (immediate parent passage, then main passage, then ancestor passages) from passage tree 2301. At step 2430, the process selects the first referential term/type from the selected related passage.

Table 2450 depicts the relationship between anaphora types (2455) and their respective referential types (2460). Pronoun type anaphors are resolved with referential types found in a parent passage of a noun or subject. Fragment type anaphors are resolved with referential types found in a parent passage of a statement, a Lexical Answer Type (LAT), or focus. Agreement type anaphors are resolved with referential types found in a parent passage of a statement or opinion, a question, or a candidate answer. At step 2440, the process identifies anaphora type(s) for the selected anaphor based on the referential type as shown in table 2450.

The process determines as to whether the identified anaphora type(s) were found in the selected child passage (decision 2465). If the identified anaphora type(s) were found in the selected child passage, then decision 2465 branches to the 'yes' branch for continued processing. On the other hand, if the identified anaphora type(s) were not found in the selected child passage, then decision 2465 branches to the 'no' branch bypassing decision 2470 and step 2475. The process determines as to whether the anaphora term found in the child passage matches the referential term found in the parent passage (decision 2470). If the anaphora term found in the child passage matches the referential term found in the parent passage, then decision 2470 branches to the 'yes' branch, whereupon, at step 2475, the process annotates the anaphora relationship with related passage referential term. In addition, at step 2475, the anaphor found in the child passage is resolved using the referential term found in the parent passage. The annotated anaphora relationship data and the resolved anaphor data is stored in passage data 2401. On the other hand, if the anaphora term found in the child passage does not match the referential term found in the parent passage, then decision 2470 branches to the 'no' branch bypassing step 2475.

The process determines as to whether there are more referential terms that need to be processed (decision 2480). If there are more referential terms that need to be processed, then decision 2480 branches to the 'yes' branch which loops back to step 2430 to select and process the next referential term. This looping continues until all referential terms have been processed, at which point decision 2480 branches to the 'no' branch.

The process determines as to whether there are more related passages that need to be processed (decision 2485). If there are more related passages that need to be processed, then decision 2485 branches to the 'yes' branch which loops back to step 22402 to select and process the next related passage. This looping continues until all related passages have been processed, at which point decision 2485 branches to the 'no' branch.

The process determines as to whether there are more anaphors included in the selected passage that need to be processed (decision 2490). If there are more anaphors included in the selected passage that need to be processed, then decision 2490 branches to the 'yes' branch whereupon processing loops back to step 2420 to select and process the next anaphor from the selected passage. This looping continues until all anaphors in the selected passage have been processed, at which point decision 2490 branches to the 'no' branch.

The process determines as to whether there are more passages in the passage tree that need to be processed (decision 2495). If there are more passages in the passage tree that need to be processed, then decision 2495 branches to the 'yes' branch which loops back to select and process the next passage from the passage tree. This looping continues until all of the passages have been processed, at which point decision 2495 branches to the 'no' branch and processing returns to the calling routine (see FIG. 5) at 2499.

Figure 25:
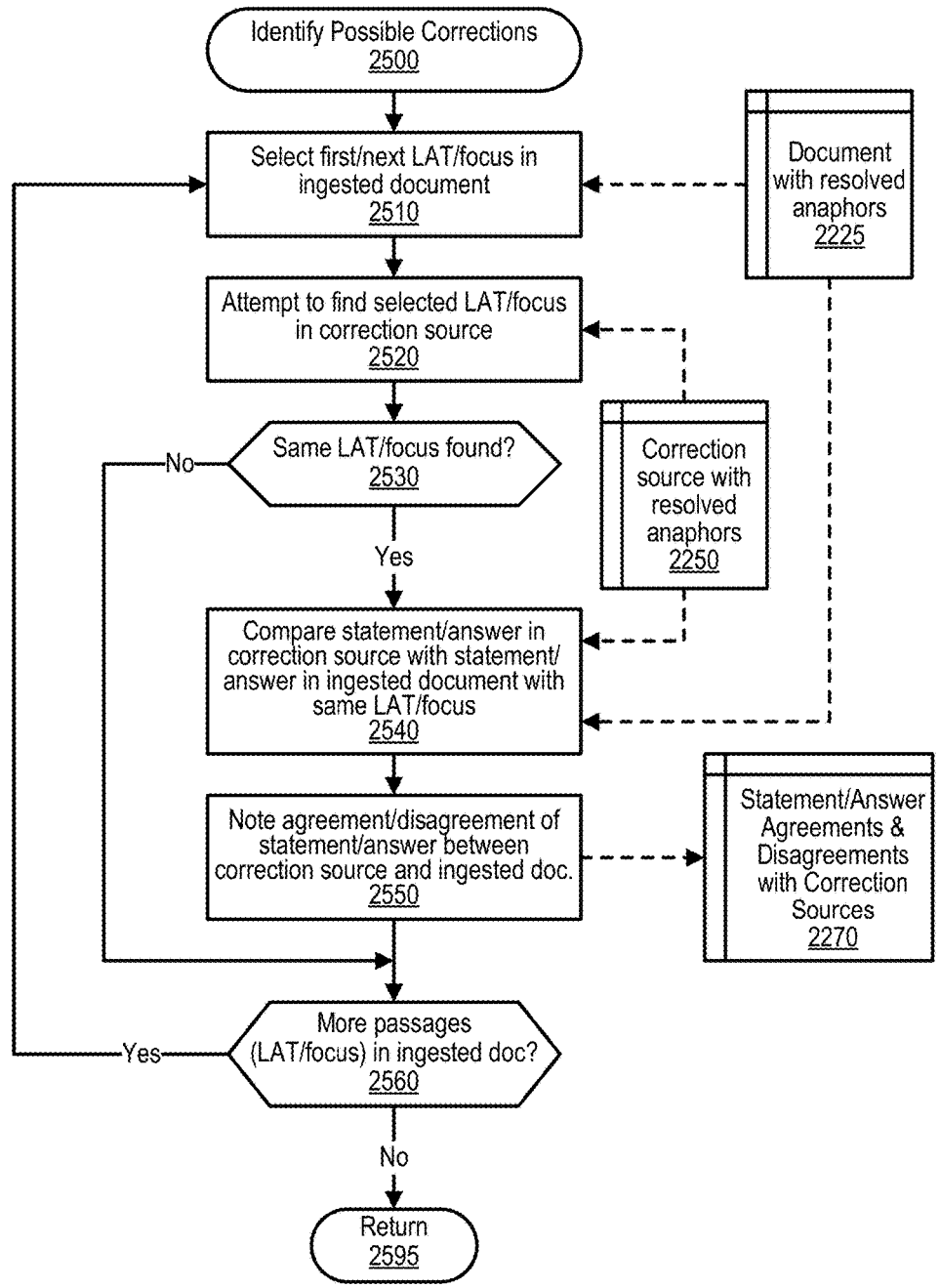
FIG. 25 is an exemplary flowchart depicting steps that identifies possible corrections based on a selected correction source.

FIG. 25 is an exemplary flowchart depicting steps that identifies possible corrections based on a selected correction source. FIG. 25 processing commences at 2500 and shows the steps taken by a process that performs a routine that identifies possible corrections to make to an ingested document. At step 2510, the process selects the first LAT/focus in the ingested document. The LAT/focus can be retrieved from memory area 2225. At step 2520, the process attempts to find the selected LAT/focus in the selected correction source with the correction source's LAT/focus being retrieved from memory area 2250. The process determines as to whether the same LAT/focus was found in both the ingested document and the correction source (decision 2530). If the same LAT/focus was found in both the ingested document and the correction source, then decision 2530 branches to the 'yes' branch to perform steps 2540 and 2550. On the other hand, if the same LAT/focus was not found in both the ingested document and the correction source, then decision 2530 branches to the 'no' branch bypassing steps 2540 and 2550. At step 2540, the process compares the statement in the correction source with the statement in the ingested document with both statements having the same LAT/focus. At step 2550, the process notes the agreement or disagreement of the statement between the correction source and the ingested document. The agreement or disagreement data is stored in memory area 2270. The process determines as to whether there are more passages (LAT/focus) in the ingested document to process (decision 2560). If there are more passages (LAT/focus) in the ingested document to process, then decision 2560 branches to the 'yes' branch which loops back to select the next LAT/focus from the ingested document and processes it as described above. This looping continues until there are no more passages (LAT/focus) to process in the ingested document, at which point decision 2560 branches to the 'no' branch and processing returns to the calling routine (see FIG. 22) at 2595.

FIG. 26 is an exemplary flowchart depicting steps that apply possible corrections to an ingested document. FIG. 26 processing commences at 2600 and shows the steps taken by a process that performs a routine that applies possible corrections to the selected ingested document. At step 2605, the process selects the first statement the from ingested document that was identified and compared to the correction sources with the resulting agreement and disagreement data being retrieved from memory area 2270.

At step 2610, the process compiles the agreement and disagreement data gathered from correction sources pertaining to the selected statement. For example, a particular statement might have agreement from five correction sources and disagreement from one correction source making it more likely that the statement in the ingested document is correct. Likewise, another statement might have agreement from no correction sources and disagreement from six correction sources, making it more likely that the statement in the ingested document is incorrect and that a correction can be found in one of the correction sources. The compiled agreement and disagreement data is stored in memory area 2615. At step 2620, the process scores the compiled agreement and disagreement data from memory area 2615 and stores the compiled scores in memory area 2625. Using the example from above, the first statement with most of the correction sources agreeing with the ingested document statement might have a score indicating that the statement is most likely true. In contrast, the second statement with all of the correction sources disagreeing with the statement from the ingestion source might have a score indicating that the statement is most likely false and should be corrected.

The process determines as to whether the score stored in memory area 2625 indicates a disagreement with the statement made in the ingestion document that exceeds a given threshold indicating that the statement is deemed to be incorrect (decision 2630). If the score indicates a disagreement with the statement made in the ingestion document that exceeds the threshold indicating that the statement is deemed to be incorrect, then decision 2630 branches to the 'yes' branch to perform steps 2635 through 2650. On the other hand, the score does not indicate a disagreement with the statement made in the ingestion document that exceeds the threshold indicating that the statement is deemed to be incorrect, then decision 2630 branches to the 'no' branch bypassing steps 2635 through 2650.

At step 2635, the process scores the statements found in the various correction sources. In one embodiment, the statements are scored using the QA system pipeline. The scores of the statements found in the correction sources are stored in memory area 2640. The process determines as to whether a "correct" answer was identified in the statement scores based on one of the statements having a high enough answer scores so that the correction statement should be used in place of the statement found in the ingested document (decision 2645). If a "correct" answer was identified, then decision 2645 branches to the 'yes' branch whereupon, at step 2650, the process records the statement from the ingested document and the replacement statement in memory area 2660. On the other hand, if a "correct" answer was not identified, then decision 2645 branches to the 'no' branch bypassing step 2650.

The process determines as to whether there are more statements from the ingested document to process (decision 2670). If there are more statements from the ingested document to process, then decision 2670 branches to the 'yes' branch which loops back to select and process the next statement as described above. This looping continues until there are no more statements to process, at which point decision 2670 branches to the 'no' branch. At predefined process 2680, the process performs the Process Corrections routine (see FIG. 27 and corresponding text for processing details). Predefined process 2680 reads the corrections from memory area 2660 and applies the correction to the ingested document in the QA system corpus. FIG. 26 processing thereafter returns to the calling routine (see FIG. 22) at 2695.

Figure 27:
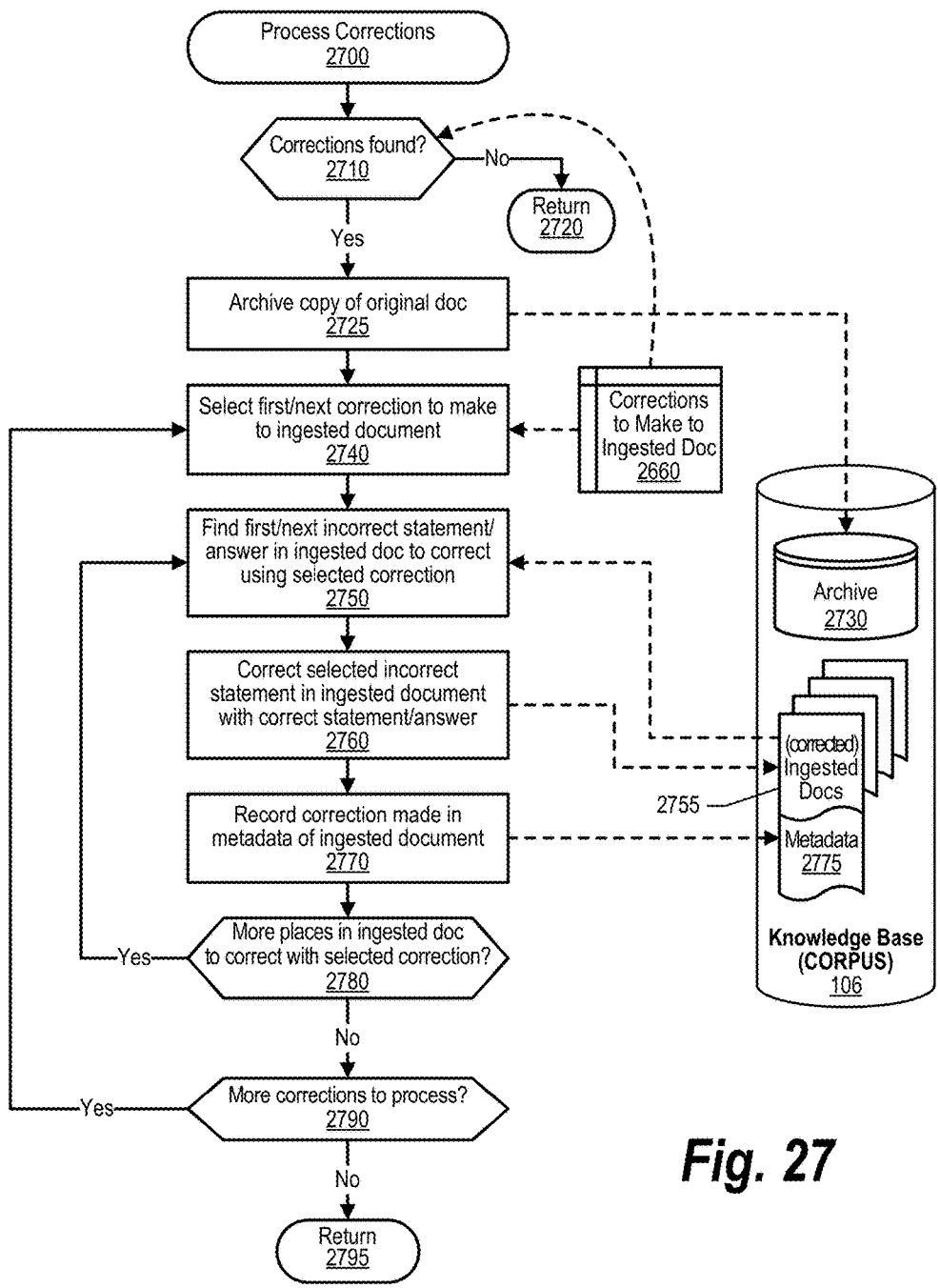
FIG. 27 is an exemplary flowchart depicting steps that processes the identified corrections in the ingested document.

FIG. 27 is an exemplary flowchart depicting steps that processes the identified corrections in the ingested document. FIG. 27 processing commences at 2700 and shows the steps taken by a process that performs a routine that processes corrections in a document previously ingested into QA system corpus 106. The process determines as to whether any corrections were found for the selected ingested document (decision 2710). If no corrections were found, then decision 2710 branches to the 'no' branch whereupon processing returns to the calling routine (see FIG. 26) without making any corrections to the ingested document. On the other hand, if corrections were found, then decision 2710 branches to the 'yes' branch and processing continues.

At step 2725, the process archives a copy of the original ingested document to archive data store 2730. The archive allows the original, uncorrected ingested document to be compared to the corrected document. At step 2740, the process selects the first correction to make to the ingested document with the correction being retrieved from memory area 2660. At step 2750, the process finds the first incorrect statement in selected ingested document 2755 to correct using the selected correction data. At step 2760, the process corrects the selected incorrect statement in the ingested document with the correct statement that was retrieved from memory area 2660.

At step 2770, the process records the correction that was made to the ingested document in metadata corresponding to the ingested document. The metadata and the archived copy of the original ingested document allow reconstruction of changes made to the ingested document.

The process determines as to whether there are more places in the ingested document to correct using the selected correction data (decision 2780). If there are more places in the ingested document to correct using the selected correction data, then decision 2780 branches to the 'yes' branch which loops back to select the next place in the ingested document with an incorrect statement that is corrected using the selected correction data. This looping continues until there are no more places in the ingested document to correct using the selected correction, at which point decision 2780 branches to the 'no' branch.

The process determines as to whether there are more corrections to process that are stored in memory area 2660 (decision 2790). If there are more corrections to process, then decision 2790 branches to the 'yes' branch which loops back to select and process the next correction as described above. This looping continues until there are no more corrections to process, at which point decision 2790 branches to the 'no' branch and processing returns to the calling routine (see FIG. 26) at 2795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   selecting a document that has been ingested by a question answering (QA) system;
   identifying a correction to the selected document from one or more correction sources, wherein the identifying comprises:
      identifying a possible correction by comparing a first statement in the selected document with a second statement from a correction source, wherein the first and second statements each pertain to a same lexical answer type (LAT) and focus;
      evaluating, by the QA system, the first statement and the second statement; and
      determining that the second statement is more correct than the first statement in response to the evaluation; and
   applying the correction to the selected document within the QA system by replacing the first statement with the second statement, wherein the selected document is part of a knowledge base utilized by the QA system to answer questions.

2. The method of claim 1 further comprising:
   identifying a term in a first passage of the selected document;
   detecting that an anaphor in a subsequent passage of the selected document references the identified term; and resolving the anaphor found in the subsequent passage with the identified term.

3. The method of claim 2 wherein the identified term relates to the identified correction.

4. The method of claim 2 further comprising:
identifying a term in a first passage of the correction source;
detecting that an anaphor in a subsequent passage of the correction source references the identified term; and
resolving the anaphor found in the subsequent passage with the identified term.

5. The method of claim 1 wherein the correction source is selected from the group consisting of a forum post, a new document, and an issued correction.

6. The method of claim 1 further comprising:
archiving an original copy of the selected document prior to applying the correction; and
recording the correction source in a metadata associated with the ingested document.

7. An information handling system comprising:
one or more processors;
one or more data stores accessible by at least one of the processors;
a memory coupled to at least one of the processors; and
a set of computer program instructions stored in the memory and executed by at least one of the processors in order to perform actions of:
selecting a document that has been ingested by a question answering (QA) system;
identifying a correction to the selected document from one or more correction sources, wherein the identifying comprises:
identifying a possible correction by comparing a first statement in the selected document with a second statement from a correction source, wherein the first and second statements each pertain to a same lexical answer type (LAT) and focus;
evaluating, by the QA system, the first statement and the second statement; and
determining that the second statement is more correct than the first statement in response to the evaluation; and
applying the correction to the selected document within the QA system by replacing the first statement with the second statement, wherein the selected document is part of a knowledge base utilized by the QA system to answer questions.

8. The information handling system of claim 7 wherein the actions further comprise:
identifying a term in a first passage of the selected document;
detecting that an anaphor in a subsequent passage of the selected document references the identified term; and
resolving the anaphor found in the subsequent passage with the identified term.

9. The information handling system of claim 8 wherein the identified term relates to the identified correction.

10. The information handling system of claim 8 wherein the actions further comprise:
identifying a term in a first passage of the correction source;
detecting that an anaphor in a subsequent passage of the correction source references the identified term; and
resolving the anaphor found in the subsequent passage with the identified term.

11. The information handling system of claim 7 wherein the correction source is selected from the group consisting of a forum post, a new document, and an issued correction.

12. The information handling system of claim 7 wherein the actions further comprise:
archiving an original copy of the selected document prior to applying the correction; and
recording the correction source in a metadata associated with the ingested document.

13. A computer program product stored in a computer readable storage medium, comprising computer program code that, when executed by an information handling system, causes the information handling system to perform actions comprising:
selecting a document that has been ingested by a question answering (QA) system;
identifying a correction to the selected document from one or more correction sources, wherein the identifying comprises:
identifying a possible correction by comparing a first statement in the selected document with a second statement from a correction source, wherein the first and second statements each pertain to a same lexical answer type (LAT) and focus;
evaluating, by the QA system, the first statement and the second statement; and
determining that the second statement is more correct than the first statement in response to the evaluation; and
applying the correction to the selected document within the QA system by replacing the first statement with the second statement, wherein the selected document is part of a knowledge base utilized by the QA system to answer questions.

14. The computer program product of claim 13 wherein the actions further comprise:
identifying a term in a first passage of the selected document;
detecting that an anaphor in a subsequent passage of the selected document references the identified term; and
resolving the anaphor found in the subsequent passage with the identified term.

15. The computer program product of claim 14 wherein the identified term relates to the identified correction.

16. The computer program product of claim 14 wherein the actions further comprise:
identifying a term in a first passage of the correction source;
detecting that an anaphor in a subsequent passage of the correction source references the identified term; and
resolving the anaphor found in the subsequent passage with the identified term.

17. The computer program product of claim 13 wherein the correction source is selected from the group consisting of a forum post, a new document, and an issued correction.

18. The computer program product of claim 13, wherein the actions further comprise:
archiving an original copy of the selected document prior to applying the correction; and
recording the correction source in a metadata associated with the ingested document.

* * * * *